US012401090B2

(12) United States Patent
Jiang

(10) Patent No.: US 12,401,090 B2
(45) Date of Patent: Aug. 26, 2025

(54) EMBOSSED SEPARATORS

(71) Applicant: Hollingsworth & Vose Company, East Walpole, MA (US)

(72) Inventor: Zhiping Jiang, Nashua, NH (US)

(73) Assignee: Hollingsworth & Vose Company, East Walpole, MA (US)

(*) Notice: Subject to any disclaimer, the term of this patent is extended or adjusted under 35 U.S.C. 154(b) by 601 days.

(21) Appl. No.: 16/786,941

(22) Filed: Feb. 10, 2020

(65) Prior Publication Data

US 2021/0249640 A1 Aug. 12, 2021

(51) Int. Cl.

*H01M 50/44* (2021.01)
*H01M 10/14* (2006.01)
*H01M 50/463* (2021.01)

(52) U.S. Cl.

CPC .......... *H01M 50/44* (2021.01); *H01M 10/14* (2013.01); *H01M 50/463* (2021.01)

(58) Field of Classification Search

CPC ..... H01M 50/463; H01M 50/44; H01M 10/06
See application file for complete search history.

(56) References Cited

U.S. PATENT DOCUMENTS 2,465,493 A 3/1949 Strickhouser et al.
4,205,122 A 5/1980 Ichikura et al.
4,216,281 A 8/1980 O'Rell et al.
4,612,238 A 9/1986 DellaVecchia et al.
5,009,971 A 4/1991 Johnson et al.
5,035,966 A 7/1991 Tokunaga et al.
5,091,275 A 2/1992 Brecht et al.
5,128,218 A 7/1992 Tokunaga et al.
5,180,647 A 1/1993 Rowland et al.
5,206,100 A 4/1993 Muto et al.
5,221,587 A 6/1993 Boehnstedt et al.
5,225,298 A 7/1993 Nakayama et al.
5,389,471 A 2/1995 Kung
5,436,094 A 7/1995 Horimoto et al.
5,541,013 A 7/1996 Shiomi et al.
5,618,642 A 4/1997 Samii et al.
5,679,479 A 10/1997 Young et al.
5,894,055 A 4/1999 Young et al.

(Continued)

FOREIGN PATENT DOCUMENTS

CN 102623659 A 8/2012
CN 105024031 A 11/2015

(Continued)

OTHER PUBLICATIONS

International Search Report and Written Opinion for PCT/US15/21761 mailed Jun. 29, 2015.

(Continued)

*Primary Examiner* — Nathanael T Zemui
(74) *Attorney, Agent, or Firm* — Wolf, Greenfield & Sacks, P.C.

(57) ABSTRACT

Battery separators comprising embossments are generally provided. The embossments may take the form of indentations formed in a surface of the battery separator, such as indentations formed by an embossing process. The embossments may comprise intersections with a first edge and a second edge of the battery separator, which may be the same or different.

20 Claims, 7 Drawing Sheets

100
400
300
600
800
500
700
200

(56) References Cited

U.S. PATENT DOCUMENTS 5,985,484 A * 11/1999 Young ................ H01M 50/463 429/143
5,989,750 A 11/1999 Ohba et al.
6,132,899 A 10/2000 Young et al.
6,143,441 A 11/2000 Zguris et al.
6,200,706 B1 3/2001 Ashida et al.
6,225,005 B1 5/2001 Shiomi et al.
6,495,288 B2 12/2002 Shiomi et al.
6,506,522 B2 1/2003 Clough
6,528,205 B1 3/2003 Kishimoto et al.
6,689,509 B2 2/2004 Zucker
6,706,450 B2 3/2004 Asada
6,939,645 B2 9/2005 Sugiyama et al.
7,097,939 B2 8/2006 Ferreira et al.
7,288,338 B2 10/2007 Zguris
8,071,239 B2 12/2011 Sugie et al.
8,197,967 B2 6/2012 Sugie et al.
8,404,378 B2 3/2013 Whear et al.
9,293,748 B1 3/2016 Ashirgade et al.
9,577,236 B2 2/2017 Ashirgade et al.
9,627,668 B1 4/2017 Ashirgade et al.
9,728,756 B2 8/2017 Ashirgade et al.
9,786,885 B2 10/2017 Jiang
10,014,501 B2 7/2018 Natesh et al.
10,135,051 B2 11/2018 Wertz et al.
10,177,360 B2 1/2019 Keisler et al.
10,270,074 B2 4/2019 Natesh et al.
10,411,239 B2 9/2019 Natesh et al.
10,431,796 B2 10/2019 Ashirgade et al.
10,535,853 B2 1/2020 Wertz et al.
10,644,289 B2 5/2020 Jiang
11,245,117 B2 2/2022 Dudenbostel et al.
11,411,280 B2 8/2022 Johns et al.
2001/0009734 A1 7/2001 Clough
2002/0142226 A1 10/2002 Zguris et al.
2003/0054236 A1 3/2003 Zucker
2003/0186126 A1 10/2003 Weerts et al.
2006/0141350 A1 6/2006 Dreyer et al.
2008/0299462 A1 12/2008 Whear et al.
2011/0091761 A1* 4/2011 Miller .................. H01M 50/44 429/143
2011/0123866 A1 5/2011 Pan et al.
2011/0147320 A1 6/2011 Sealey et al.
2011/0177375 A1 7/2011 Pfanner et al.
2011/0293988 A1 12/2011 Obernyer et al.
2012/0070713 A1 3/2012 Whear et al.
2012/0070714 A1 3/2012 Chambers et al.
2012/0070727 A1 3/2012 Wertz et al.
2012/0070728 A1 3/2012 Wertz et al.
2012/0070729 A1 3/2012 Wertz et al.
2012/0070747 A1 3/2012 Whear et al.
2012/0145468 A1 6/2012 Pekala et al.
2012/0270110 A1 10/2012 Waterhouse et al.
2013/0017432 A1 1/2013 Roumi
2013/0029229 A1 1/2013 Mack et al.
2013/0071723 A1 3/2013 Wertz et al.
2013/0071734 A1 3/2013 Wertz et al.
2013/0071735 A1 3/2013 Wertz et al.
2013/0224632 A1 8/2013 Roumi
2013/0273409 A1 10/2013 Nandi et al.
2013/0344373 A1 12/2013 Miller et al.
2014/0134498 A1 5/2014 Lim et al.
2014/0227585 A1 8/2014 Wertz et al.
2014/0234685 A1 8/2014 Nitta et al.
2014/0255752 A1 9/2014 Miller et al.
2014/0255789 A1 9/2014 Miller et al.
2014/0272535 A1 9/2014 Clement et al.
2014/0349169 A1 11/2014 Mizuno et al.
2014/0377628 A1 12/2014 Nandi et al.
2015/0050540 A1 2/2015 Toduka et al.
2015/0086838 A1 3/2015 Guo et al.
2016/0079581 A1* 3/2016 Ashirgade ........... H01M 50/463 429/246
2016/0149183 A1 5/2016 Keisler et al.
2016/0164058 A1 6/2016 Ashirgade et al.
2016/0301053 A1 10/2016 Jiang
2017/0092917 A1 3/2017 Ashirgade et al.
2017/0170442 A1 6/2017 Ashirgade et al.
2017/0179454 A1 6/2017 Natesh et al.
2017/0294639 A1* 10/2017 Natesh ................ H01M 50/414
2017/0373293 A1 12/2017 Jiang
2018/0026247 A1 1/2018 Ashirgade et al.
2018/0047964 A1* 2/2018 Natesh ................ H01M 50/489
2018/0145298 A1 5/2018 Vulfson et al.
2018/0175392 A1 6/2018 Wertz et al.
2018/0269452 A1 9/2018 Natesh et al.
2019/0115579 A1 4/2019 Wertz et al.
2019/0157646 A1 5/2019 Keisler et al.
2019/0181410 A1 6/2019 Kumar et al.
2019/0181506 A1 6/2019 Clement et al.
2019/0280273 A1 9/2019 Natesh et al.
2019/0393464 A1 12/2019 Rocha et al.
2020/0328390 A1 10/2020 Kumar et al.
2022/0166107 A1 5/2022 Keisler et al.
2022/0247037 A1 8/2022 Wertz et al.
2022/0336925 A1 10/2022 Jiang
2023/0369681 A1 11/2023 Jiang
2024/0021957 A1 1/2024 Kodimole Mahadevappa et al.
2024/0405366 A1 12/2024 Clement et al.

FOREIGN PATENT DOCUMENTS

CN 204905333 U 12/2015
CN 204905334 U 12/2015
CN 105428570 A 3/2016
CN 107836050 A 3/2018
CN 109473613 A 3/2019
EP 0 015 970 B1 6/1983
EP 0 349 868 A1 1/1990
EP 0 466 302 A1 1/1992
EP 0 680 105 A1 11/1995
EP 1 585 182 A1 10/2005
EP 1 617 495 1/2006
ES 2288780 T3 1/2008
GB 679 514 A 9/1952
GB 1 107 783 A 3/1968
GB 1 169 652 A 11/1969
GB 1 291 987 A 10/1972
JP 2004-253188 A 9/2004
JP 2006-236991 A 9/2006
JP 2011-233390 A 11/2011
KR 100645970 B1 11/2006
WO WO 01/13442 A1 2/2001
WO WO 2012/040395 A2 3/2012
WO WO 2013/078292 A2 5/2013
WO WO 2013/154623 A1 10/2013
WO WO 2014/149703 A1 9/2014
WO WO 2016/134222 A1 8/2016
WO WO 2016/179362 A1 11/2016

OTHER PUBLICATIONS

[No Author Listed], Micrex/Microcreper. Micrex Corporation. Walpole, MA. In existence as of Jan. 2015. Last accessed Jun. 6, 2017 at <http://micrex.com/micrexmicrocreper>. 4 pages.

Turbak, Nonwovens: Theory, Process, Performance, and Testing. Tappi Press 1993. Excerpt pp. 144-147.

Zguris et al., Nonwovens Battery Separators to improve performance in lead acid battery systems. Mabat Conference. Warsaw, Poland. Jul. 24, 1991.

U.S. Appl. No. 16/282,950, filed Feb. 22, 2019, Natesh et al.
U.S. Appl. No. 15/983,299, filed May 18, 2018, Natesh et al.
U.S. Appl. No. 16/193,341, filed Nov. 16, 2018, Keisler et al.
U.S. Appl. No. 16/161,380, filed Oct. 16, 2018, Wertz et al.
U.S. Appl. No. 15/839,810, filed Dec. 12, 2017, Clement et al.
U.S. Appl. No. 16/009,978, filed Jun. 15, 2018, Kumar et al.
U.S. Appl. No. 16/382,901, filed Apr. 12, 2019, Yegya-Raman et al.
U.S. Appl. No. 16/435,233, filed Jun. 7, 2019, Kumar et al.

* cited by examiner

EMBOSSED SEPARATORS

FIELD

The present invention relates to generally to battery separators, and, more particularly, to battery separators comprising a plurality of embossments.

BACKGROUND

Separators are typically employed in lead-acid batteries to separate the battery plates therein. However, many such separators, particularly such separators for AGM batteries, are undesirable because they exhibit high acid filling times and non-uniform acid filling rates. Accordingly, improved separator designs are needed.

SUMMARY

Battery separators, related components, and related methods are generally described.

In some embodiments, a battery separator is provided. The battery separator comprises a fiber web comprising a plurality of glass fibers. The fiber web comprises a first surface. The first surface is embossed with a plurality of embossments. The plurality of embossments comprises embossments that each comprise at least a first intersection with a first edge of the fiber web and a second intersection with a second edge of the fiber web.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
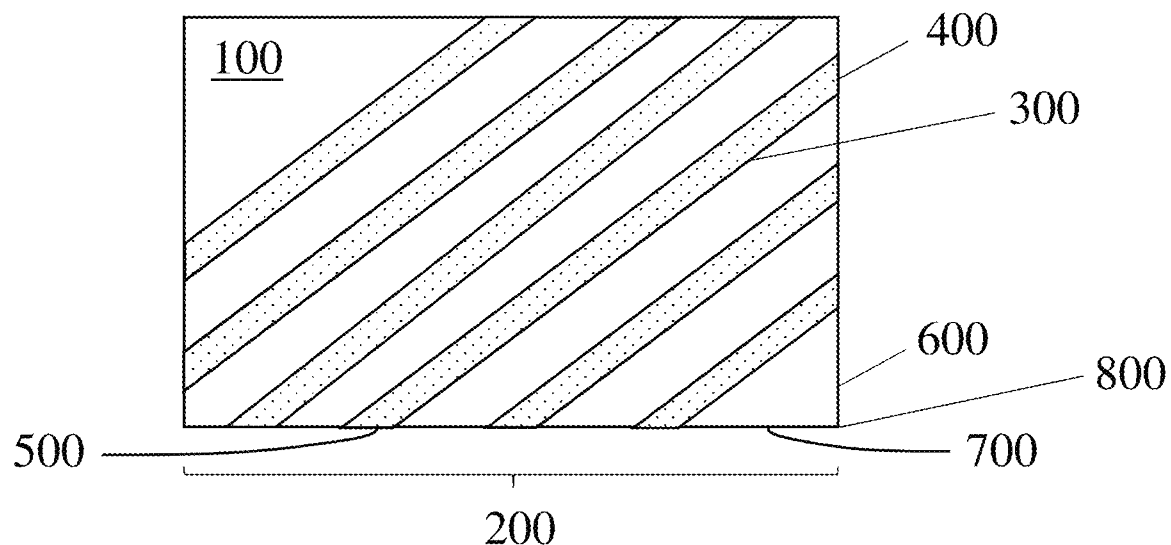
FIGS. 1-2 show one non-limiting embodiment of a battery separator comprising a plurality of embossments embossed in the surface thereof, in accordance with some embodiments.

Battery separators comprising embossments are generally provided. The embossments may take the form of indentations formed in a surface of the battery separator, such as indentations formed by an embossing process.

Some of the battery separators described herein may be particularly suitable for use in lead-acid batteries, such as AGM batteries. Without wishing to be bound by any particular theory, it is believed that it may be especially challenging to remove air from battery separators positioned in AGM batteries. It is believed that the initial introduction of acid into an AGM battery may push the air initially present therein towards the center of the separator, and that such air, once positioned in the center of the separator, may be particularly challenging to remove therefrom. Additionally, AGM batteries may be configured such that the battery separators therein are compressed, a configuration that is believed to reduce and/or eliminate open spaces in the battery separator (and/or surrounding the battery separator) through which air positioned in the battery separator (e.g., in the center thereof) may easily escape. For at least this reason, it is believed that the introduction of open spaces intersecting one or more edges of a fiber web in a battery separator, such as the embossments described herein, may be particularly beneficial in AGM batteries.

Disadvantageously, filling the center of a battery separator at a time appreciably later than the time at which outer portions of the battery separator fill with acid may decrease the functionality of the battery in which the battery separator is positioned. As the acid is believed to react with the battery plates, and thereby be diluted, over time, such later-introduced acid is believed to be at a lower concentration than the acid introduced into the edges of the separator at earlier points in time. It is also believed that lead sulfate is more soluble in, and thus present at a higher concentration in, this lower-concentration acid than in higher-concentration acid. Undesirably, dissolved lead sulfate may precipitate to form lead during formation. When such precipitation occurs in significant amounts, such as amounts typical for precipitation from dilute acid, it may cause the battery in which such precipitation occurs to fail.

The embossments described herein may advantageously reduce the acid filling time of the battery separators in which they are positioned compared to similar battery separators that do not have embossments, all other factors being equal. Without wishing to be bound by any particular theory, it is believed that the presence of air in a battery separator hinders the filling of the battery separator by acid; thus, features that facilitate the removal of air from battery separators may facilitate the introduction of acid thereinto. More specifically, it is believed that any given location in the battery separator can only be occupied by one fluid at a time and so air present in one or more locations in the battery separator prevents acid from occupying that or those same location(s) before it is removed therefrom. It is also believed that the embossments described herein, such as embossments that comprise at least two intersections with edges of a fiber web positioned in a battery separator, are particularly suitable for facilitating removal of air from battery separators. Such embossments are believed to enhance transport of air from the interior of the battery separator to the edge(s) via the space provided by the embossments. Once at the edge(s) of the battery separator, the air transported thereto is believed to be capable of readily escaping the battery.

In some embodiments, a battery separator described herein comprises a plurality of embossments that reduce acid filling time while not negatively affecting other properties of the battery separator. By way of example, some battery separators may both comprise a plurality of embossments and have one or more mechanical properties that are comparable to those of an otherwise equivalent separator lacking the plurality of embossments. As another example, some battery separators may comprise a plurality of embossments that has enhanced mechanical properties in comparison to an otherwise equivalent battery separator comprising a different type of embossments.

Designs for exemplary battery separators comprising embossments and their properties are provided in further detail below.

Figure 2:
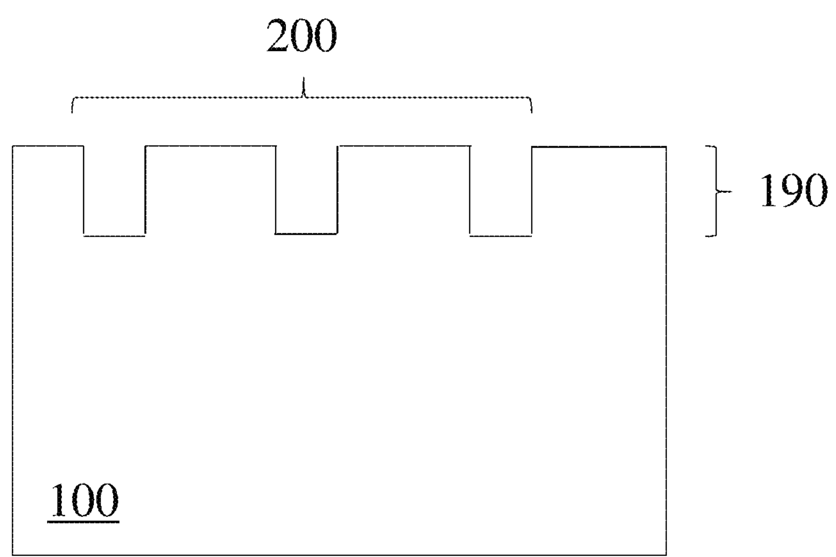

FIGS. 1 and 2 show top and side views, respectively, of one non-limiting embodiment of a battery separator comprising a plurality of embossments. In FIGS. 1 and 2, a battery separator 100 comprises a plurality of embossments 200 embossed in the surface 190 thereof. Such embossments may have one or more advantageous features. For instance, in some embodiments, like the embodiment shown illustratively in FIGS. 1 and 2, a plurality of embossments comprises one or more embossments that comprise at least two intersections with edges of the battery separator. For instance, with respect to FIG. 1, the embossment 300 comprises the first and second intersections 400 and 500, respectively, with the first and second edges, 600 and 700, respectively, of the battery separator. Similarly, like in the embodiment shown in FIG. 1, some embodiments relate to battery separators comprising embossments intersecting with two different edges of the battery separator (i.e., for which the first and second edges are different).

Figure 3:
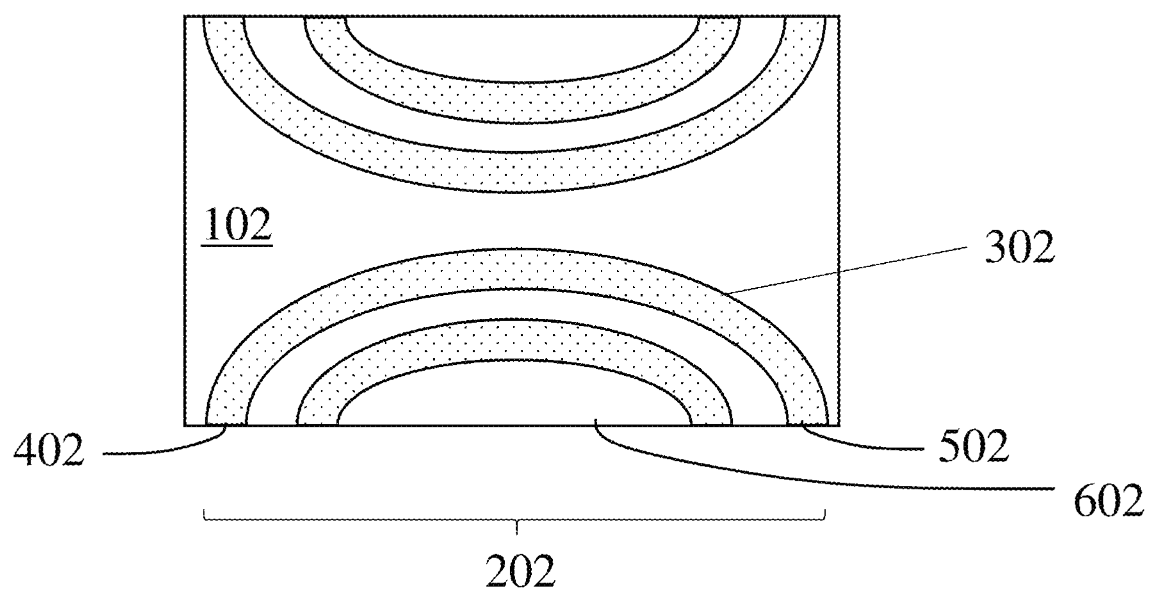
FIG. 3 shows one non-limiting example of a battery separator comprising embossments intersecting only with a single edge of the battery separator, in accordance with some embodiments.

Other embodiments relate to battery separators comprising embossments intersecting only with a single edge of the battery separator. FIG. 3 shows one non-limiting example of a battery separator comprising embossments of this, latter type. In FIG. 3, the battery separator 102 comprises a plurality of embossments 202, each of which comprises at least two intersections with a single side thereof. With reference to FIG. 3, the embossment 302 comprises the first and second intersections 402 and 502, respectively, with the edge 602 of the battery separator. It is also possible for a plurality of embossments to comprise three or more intersections with one or more edges of the battery separator (i.e., three or more intersections with a single side of the battery separator, three or more intersections with two different sides of the battery separator, three or more intersections with three different sides of the battery separator, four or more intersections with four different sides of the battery separator). The embossments may comprise at least one intersection with an edge of the battery separator parallel to the machine direction and/or at least one intersection with an edge of the battery separator parallel to the cross direction.

The battery separators described herein are often produced in processes such that the separator is formed and wound around a roll (e.g., in a continuous process). In such embodiments, the "machine direction" of the separator refers to the direction in the separator along which it is wound around the roll. During fabrication of the battery separator, tensile force may be applied to the separator in this direction to wind it around the roll. The "cross direction" of the separator refers to the direction perpendicular to the machine direction.

Figure 4A:
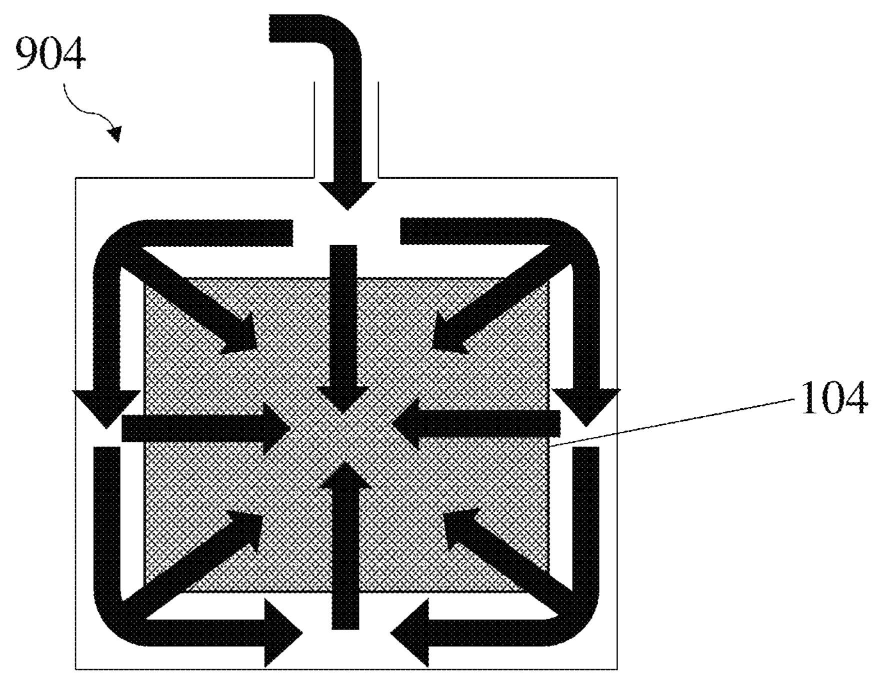
FIG. 4A shows one non-limiting example of a path that acid may take upon entering a battery comprising a battery separator, in accordance with some embodiments.
Figure 4B:
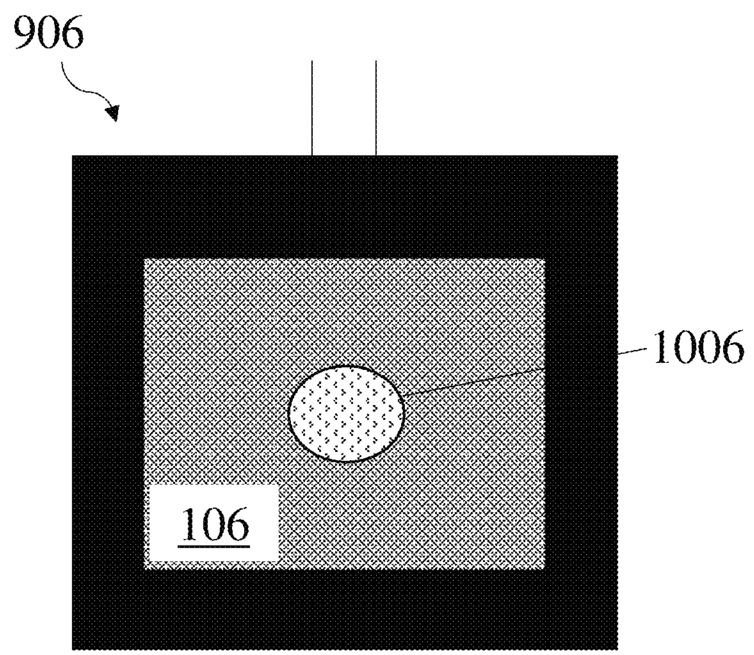
FIG. 4B shows one example of a location that air may be displaced to in a battery separator after the acid has been introduced thereto.

As described elsewhere herein, the introduction of acid into a separator positioned in an AGM battery may cause any air initially present therein to be pushed towards the center of the separator. Separators in AGM batteries may be positioned therein such that they do not extend fully across the widths of battery cans enclosing the battery plates and the battery separators. In other words, there may be a periphery surrounding the separator laterally that is initially open. It is also possible for AGM batteries to be configured such that the battery plates compress the battery separators. Acid introduced into such batteries may initially flow into the open spaces surrounding the separator, and then into the separator from the outer edges inwards. This may push air initially present around the periphery of the battery separator and/or at the edges of the battery separator towards the center of the battery separator. Once present in the center of the battery separator, such air may be particularly challenging to remove therefrom if there is not an open space through which the air can pass out of the separator. FIG. 4A shows one non-limiting example of a path that acid may take upon entering a battery 904 comprising a battery separator 104. FIG. 4B shows one example of a location 1006 that air is displaced to in such a battery separator after the acid has been introduced thereto. In some cases, for battery separators in which air is trapped in the center to a particularly high degree, even the application of vacuum to the battery separator during and/or after acid filling may not be capable of removing all of the air from the battery separator and/or may only do so relatively slowly.

Figure 5:
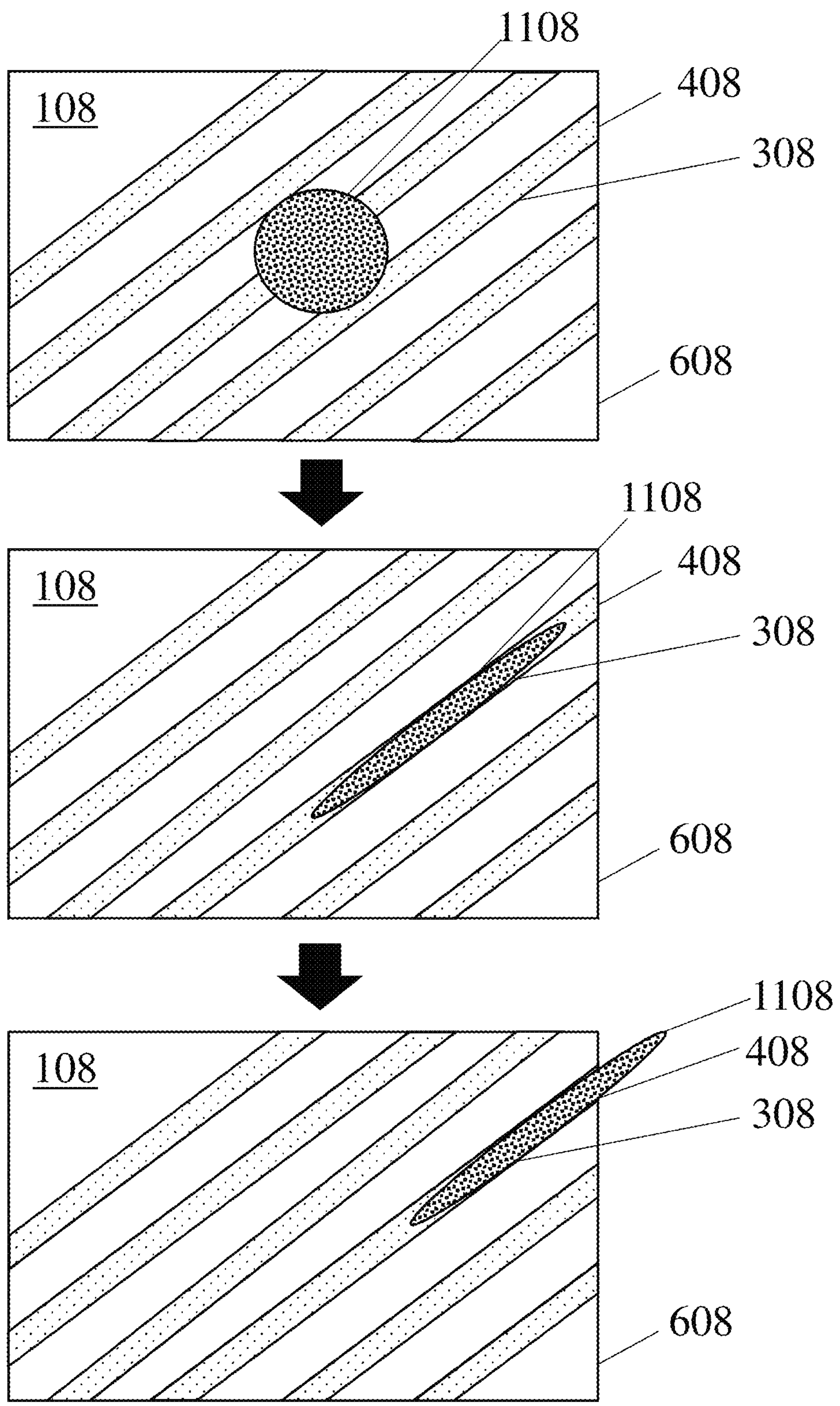
FIG. 5 shows one non-limiting example of a manner in which an embossment may transport an air bubble out of a battery separator, in accordance with some embodiments.

Battery separators having a structure similar to that shown in FIGS. 1-3 (e.g., comprising embossments that comprise at least two intersections with edges of the battery separator) may facilitate transport of air out of the battery separator (e.g., air positioned in the center thereof, such as in the location shown in FIG. 4B) via the embossments. In other words, in some embodiments, a battery separator having a structure similar to that shown in FIGS. 1-3 may help remove air from the battery separator that would otherwise be trapped in the center thereof in a relatively fast manner. The air may be transported from the interior of the battery separator, along the embossment to an edge of the battery separator, and then out of the battery separator via the intersection of the embossment with the edge of the battery separator. With reference to FIG. 5, an air bubble 1108 initially positioned in the battery separator 108 may be transported to the edge 608 of the battery separator via the open space provided by the embossment 308. The air bubble may subsequently pass through the intersection 408 of the embossment with the edge 608 of the battery separator and out of the battery separator.

In some embodiments, a battery separator comprises a plurality of embossments comprising embossments that intersect two edges of the battery separator, and the two edges are not parallel to each other and/or not of the same type. By way of example, some pluralities of embossments comprise embossments that intersect two edges that, themselves, intersect each other. With reference to FIG. 1, which shows embossments having this property, the embossment 300 comprises intersections with the edges 600 and 700, and these edges intersect each other at the corner 800.

In some embodiments, a battery separator, such as a battery separator comprising embossments intersecting edges that themselves intersect each other, lack (or comprise in relatively small amounts) embossments that intersect parallel edges of the battery separator and/or embossments that intersect two edges of the same type. Without wishing to be bound by any particular theory, it is believed that embossments intersecting edges of the same type, which are often parallel to each other, may weaken the battery separator. It is believed that such embossments may be weaker than surrounding, unembossed, portions of the battery separator, and that a weak portion of the battery separator connecting two edges of the same type (e.g., connecting two edges parallel to the machine direction, connecting two edges parallel to the cross direction) may be more prone to failure than a similarly weak portion of the battery separator connecting two edges of different types (e.g., connecting an edge parallel to the machine direction to an edge parallel to the cross direction). In particular, in some embodiments, it may be particularly advantageous for battery separators to lack (or comprise in relatively small amounts) embossments that intersect with two different edges that are both perpendicular to the cross direction (e.g., two different edges that are both parallel to the machine direction). This is because, as described above, fabrication of the battery separator may comprise applying a tensile force to an embossed component of the battery separator along the machine direction (and perpendicular to the cross direction), making it particularly undesirable for there to be weak portions of the embossed component oriented perpendicular thereto and/or connecting sides of the battery separator perpendicular thereto.

It should also be understood that, in some embodiments, a battery separator comprises (e.g., in an appreciable amount) embossments that intersect parallel edges of the battery separator and/or edges of the same type. These parallel edges may be edges that are, themselves, parallel to the cross direction or parallel to the machine direction.

It is also noted that the battery separators described herein may comprise a plurality of embossments comprising embossments having one or more features similar to those shown in FIGS. 1-3 other than those described above. By way of example, in some embodiments, the plurality of embossments comprises embossments that are uniform in one or more ways. For instance, a battery separator may comprise a plurality of embossments that are relatively evenly spaced (e.g., for which the distance between each embossment and its two nearest neighbors, as averaged across the embossment, varies by less than 10%, less than 5%, less than 2%, or less than 1% across the battery separator), have relatively uniform widths (e.g., for which the average width of each embossment, as averaged across the embossment, varies by less than 10%, less than 5%, less than 2%, or less than 1% across the battery separator), and/or form shapes that are relatively similar (e.g., for which the average degree of overlap between any two embossments in the battery separator, if translated to have the maximum possible overlap with each other, is greater than 90%, greater than 95%, greater than 98%, or greater than 99%). As another example, in some embodiments, a plurality of embossments comprises embossments that are relatively elongated (e.g., that have a relatively high ratio of length to width). As a third example, some pluralities of embossments may comprise embossments that are straight. When an embossment is straight, then curves, bends, and/or kinks may make up a relatively small percentage thereof (e.g., less than 10%, less than 5%, less than 2%, or less than 1% of the volume of the embossment) and/or the embossment may lack curves, bends, and/or kinks.

The battery separators described herein may also comprise embossments that differ from the embossments shown in FIGS. 1-3 in one or more ways. For instance, the plurality of embossments may comprise embossments that are not uniform (e.g., not relatively evenly spaced, having differing widths, and/or forming different shapes). Similarly, it is also possible for a battery separator to comprise embossments that are curved, bent, and/or kinked (e.g., to a relatively high degree), such as the plurality of embossments shown in illustratively in FIG. 3.

Figure 6:
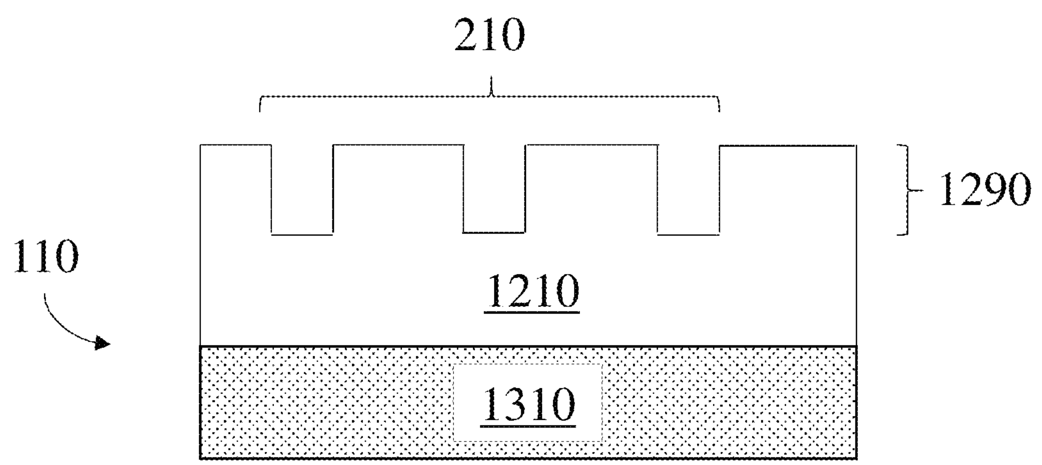
FIG. 6 shows one non-limiting embodiment of a side view of a battery separator comprising two layers, one of which comprises a plurality of embossments, in accordance with some embodiments.

In some embodiments, a battery separator is formed of a single layer (e.g., a single layer comprising an embossed surface). However, in other embodiments, a battery separator comprises two or more layers. In some such cases, at least one of the layers of the battery separator, such as an external layer therein, comprises a plurality of embossments. FIG. 6 shows one non-limiting embodiment of a side view of a battery separator comprising two layers, one of which comprises a plurality of embossments. In FIG. 6, the battery separator 110 comprises a first layer 1210 that comprises a plurality of embossments 206 and a second layer 1310 that is unembossed. The embossments 210 are embossed on the surface 1290 of the first layer 1210. It is also possible for a battery separator to comprise three, four, or more layers, at least one of which comprise a plurality of embossments (e.g., embossments on a surface of an external layer therein). Like in FIGS. 2 and 6, it is possible for a battery separator to comprise one external surface that comprises a plurality of embossments embossed thereon and a second, opposite external surface that lacks embossments.

Figure 7:
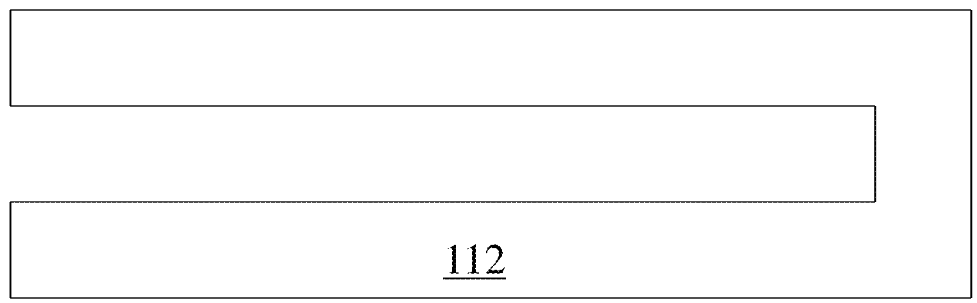
FIG. 7 shows one non-limiting embodiment of a folded separator, in accordance with some embodiments.
Figure 8:
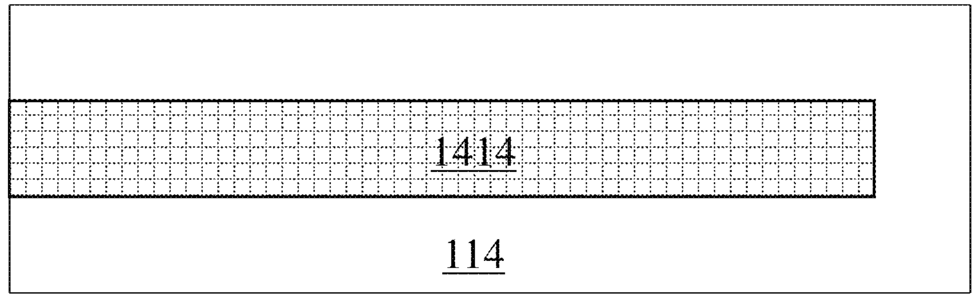
FIG. 8 shows one non-limiting embodiment of a folded separator folded around a battery plate, in accordance with some embodiments.
Figure 9:
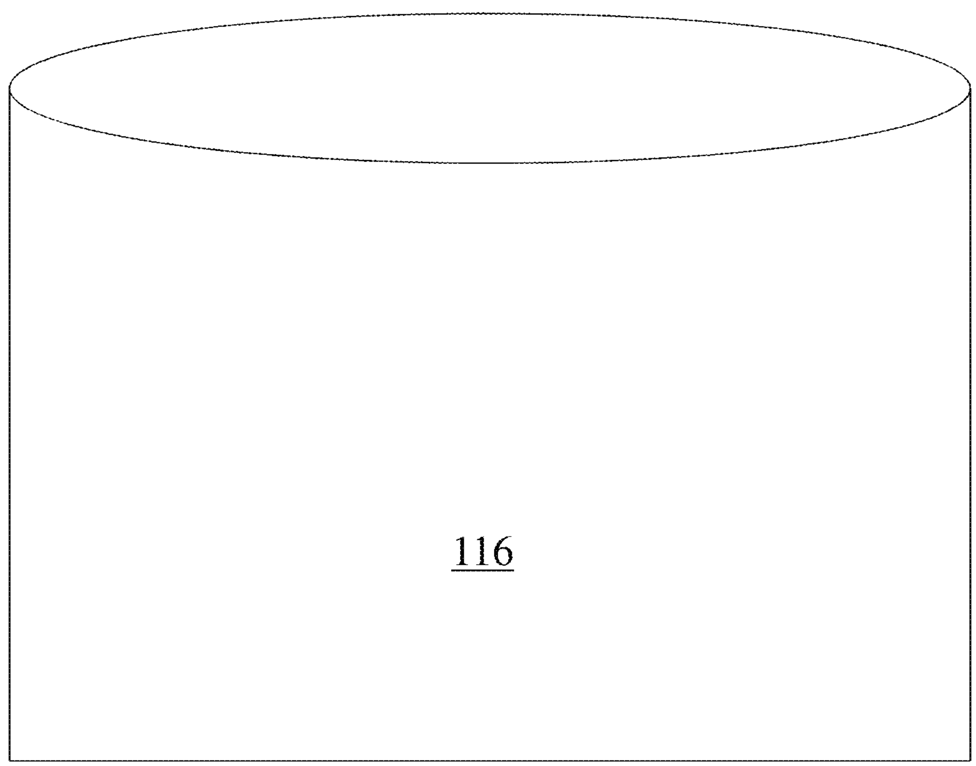
FIG. 9 shows one non-limiting embodiment of a pocket separator, in accordance with some embodiments.

The battery separators described herein may have a variety of suitable designs. In some embodiments, like the embodiments shown in FIGS. 1-3, the battery separator is a leaf separator. Other suitable types of battery separators include, but are not limited to, folded separators, pocket separators, z-fold separators, sleeve separators, corrugated separators, C-wrap separators, and U-wrap separators. FIG. 7 shows one non-limiting embodiment of a folded separator 112, which may be folded around a battery plate when positioned in a battery. This configuration is shown in FIG. 8, in which a folded separator 114 is folded around a battery plate 1414. FIG. 9 shows one non-limiting embodiment of a pocket separator 116, which is sealed on three sides and is open on the final side. A battery plate may be positioned inside the pocket formed by this separator when positioned in a battery (not shown). In some embodiments, a battery separator comprises embossments embossed on a surface thereof configured to be positioned, and/or that is positioned, closest to the battery plate and/or directly contacting the battery plate.

When present, the embossments may make a variety of percentages of the surface area of a surface on which they are positioned (e.g., a surface, such as an external surface, of a battery separator and/or layer therein). In some embodiments, the embossments make up greater than or equal to 2%, greater than or equal to 2.25%, greater than or equal to 2.5%, greater than or equal to 2.75%, greater than or equal to 3%, greater than or equal to 3.25%, greater than or equal to 3.5%, greater than or equal to 3.75%, greater than or equal to 4%, greater than or equal to 4.25%, greater than or equal to 4.5%, greater than or equal to 5%, greater than or equal to 6%, greater than or equal to 7%, greater than or equal to 8%, greater than or equal to 10%, greater than or equal to 12.5%, greater than or equal to 15%, greater than or equal to 17.5%, greater than or equal to 20%, greater than or equal to 22.5%, greater than or equal to 25%, greater than or equal to 27.5%, greater than or equal to 30%, greater than or equal to 32.5%, greater than or equal to 35%, greater than or equal to 40%, or greater than or equal to 45% of the surface area of a surface on which they are positioned. In some embodiments, the embossments make up less than or equal to 50%, less than or equal to 45%, less than or equal to 40%, less than or equal to 35%, less than or equal to 32.5%, less than or equal to 30%, less than or equal to 27.5%, less than or equal to 25%, less than or equal to 22.5%, less than or equal to 20%, less than or equal to 17.5%, less than or equal to 15%, less than or equal to 12.5%, less than or equal to 10%, less than or equal to 8%, less than or equal to 7%, less than or equal to 6%, less than or equal to 5%, less than or equal to 4.5%, less than or equal to 4.25%, less than or equal to 4%, less than or equal to 3.75%, less than or equal to 3.5%, less than or equal to 3.25%, less than or equal to 3%, less than or equal to 2.75%, less than or equal to 2.5%, or less than or equal to 2.25% of the surface area of a surface on which they are positioned. Combinations of the above-referenced ranges are also possible (e.g., greater than or equal to 2% and less than or equal to 50%, greater than or equal to 3% and less than or equal to 30%, or greater than or equal to 4% and less than or equal to 20%). Other ranges are also possible.

When present, the embossments may have a variety of suitable average depths. In some embodiments, the average depth of the embossments is greater than or equal to 50 microns, greater than or equal to 60 microns, greater than or equal to 80 microns, greater than or equal to 100 microns, greater than or equal to 125 microns, greater than or equal to 150 microns, greater than or equal to 175 microns, greater than or equal to 200 microns, greater than or equal to 250 microns, greater than or equal to 300 microns, greater than or equal to 350 microns, greater than or equal to 400 microns, greater than or equal to 500 microns, greater than or equal to 750 microns, greater than or equal to 1 mm, greater than or equal to 1.25 mm, greater than or equal to 1.5 mm, greater than or equal to 1.75 mm, greater than or equal to 2 mm, greater than or equal to 2.25 mm, greater than or equal to 2.5 mm, or greater than or equal to 2.75 mm. In some embodiments, the average depth of the embossments is less than or equal to 3 mm, less than or equal to 2.75 mm, less than or equal to 2.5 mm, less than or equal to 2.25 mm, less than or equal to 2 mm, less than or equal to 1.75 mm, less than or equal to 1.5 mm, less than or equal to 1.25 mm, less than or equal to 1 mm, less than or equal to 750 microns, less than or equal to 500 microns, less than or equal to 400 microns, less than or equal to 350 microns, less than or equal to 300 microns, less than or equal to 250 microns, less than or equal to 200 microns, less than or equal to 175 microns, less than or equal to 150 microns, less than or equal to 125 microns, less than or equal to 100 microns, less than or equal to 80 microns, or less than or equal to 60 microns. Combinations of the above-referenced ranges are also possible (e.g., greater than or equal to 50 microns and less than or equal to 3 mm, greater than or equal to 100 microns and less than or equal to 2.5 mm, or greater than or equal to 150 microns and less than or equal to 2 mm). Other ranges are also possible.

Cross-sectional SEM may be employed to determine the average depth of embossments having an average depth of less than or equal to 1 mm. Optical microscopy may be employed to determine the average depth of embossments having an average depth of greater than 1 mm.

For some battery separators (and/or layers therein), it is convenient to characterize the average depth of the embossments with respect to the thickness of the battery separator (and/or embossed layer) after embossing. The thickness of the battery separator and/or embossed layer may be that determined by cross-sectional SEM for battery separators and/or embossed layers comprising embossments having an average depth of less than or equal to 1 mm. The thickness of the battery separator and/or embossed layer may be that determined by optical microscopy for battery separators and/or embossed layers comprising embossments having an average depth of greater than 1 mm. The average depth of the embossments may also be determined during the same cross-sectional SEM or optical microscopy procedure employed to determine the thickness of the battery separator and/or embossed layer. The embossments may have an average depth that is greater than or equal to 5%, greater than or equal to 5.5%, greater than or equal to 6%, greater than or equal to 6.5%, greater than or equal to 7%, greater than or equal to 7.5%, greater than or equal to 8%, greater than or equal to 9%, greater than or equal to 10%, greater than or equal to 12.5%, greater than or equal to 15%, greater than or equal to 17.5%, greater than or equal to 20%, greater than or equal to 22.5%, greater than or equal to 25%, greater than or equal to 27.5%, greater than or equal to 30%, greater than or equal to 32.5%, greater than or equal to 35%, greater than or equal to 37.5%, greater than or equal to 40%, or greater than or equal to 45% of the thickness of the battery separator (and/or embossed layer). The embossments may have an average depth that is less than or equal to 50%, less than or equal to 45%, less than or equal to 40%, less than or equal to 37.5%, less than or equal to 35%, less than or equal to 32.5%, less than or equal to 30%, less than or equal to 27.5%, less than or equal to 25%, less than or equal to 22.5%, less than or equal to 20%, less than or equal to 17.5%, less than or equal to 15%, less than or equal to 12.5%, less than or equal to 10%, less than or equal to 9%, less than or equal to 8%, less than or equal to 7.5%, less than or equal to 7%, less than or equal to 6.5%, less than or equal to 6%, or less than or equal to 5.5% of the thickness of the battery separator (and/or embossed layer). Combinations of the above-referenced ranges are also possible (e.g., greater than or equal to 5% and less than or equal to 50%, greater than or equal to 7% and less than or equal to 40%, or greater than or equal to 10% and less than or equal to 35%). Other ranges are also possible.

When present, the embossments may have a variety of suitable average widths. In some embodiments, the average width of the embossments is greater than or equal to 0.1 mm, greater than or equal to 0.125 mm, greater than or equal to 0.15 mm, greater than or equal to 0.175 mm, greater than or equal to 0.2 mm, greater than or equal to 0.225 mm, greater than or equal to 0.25 mm, greater than or equal to 0.275 mm, greater than or equal to 0.3 mm, greater than or equal to 0.325 mm, greater than or equal to 0.35 mm, greater than or equal to 0.4 mm, greater than or equal to 0.5 mm, greater than or equal to 0.75 mm, greater than or equal to 1 mm, greater than or equal to 1.25 mm, greater than or equal to 1.5 mm, greater than or equal to 2 mm, greater than or equal to 3 mm, greater than or equal to 4 mm, greater than or equal to 5 mm, greater than or equal to 6 mm, greater than or equal to 8 mm, greater than or equal to 10 mm, greater than or equal to 12.5 mm, greater than or equal to 15 mm, or greater than or equal to 17.5 mm. In some embodiments, the average width of the embossments is less than or equal to 20 mm, less than or equal to 17.5 mm, less than or equal to 15 mm, less than or equal to 12.5 mm, less than or equal to 10 mm, less than or equal to 8 mm, less than or equal to 6 mm, less than or equal to 5 mm, less than or equal to 4 mm, less than or equal to 3 mm, less than or equal to 2 mm, less than or equal to 1.5 mm, less than or equal to 1.25 mm, less than or equal to 1 mm, less than or equal to 0.75 mm, less than or equal to 0.5 mm, less than or equal to 0.4 mm, less than or equal to 0.35 mm, less than or equal to 0.325 mm, less than or equal to 0.3 mm, less than or equal to 0.275 mm, less than or equal to 0.25 mm, less than or equal to 0.225 mm, less than or equal to 0.2 mm, less than or equal to 0.175 mm, less than or equal to 0.15 mm, or less than or equal to 0.125 mm. Combinations of the above-referenced ranges are also possible (e.g., greater than or equal to 0.1 mm and less than or equal to 20 mm, greater than or equal to 0.2 mm and less than or equal to 10 mm, or greater than or equal to 0.3 mm and less than or equal to 5 mm). Other ranges are also possible.

When present, the embossments may have a variety of suitable average lengths and/or end-to-end distances. In some embodiments, the average length and/or end-to-end distance of the embossments is greater than or equal to 2 cm, greater than or equal to 2.25 cm, greater than or equal to 2.5 cm, greater than or equal to 2.75 cm, greater than or equal to 3 cm, greater than or equal to 3.25 cm, greater than or equal to 3.5 cm, greater than or equal to 3.75 cm, greater than or equal to 4 cm, greater than or equal to 4.25 cm, greater than or equal to 4.5 cm, greater than or equal to 5 cm, greater than or equal to 6 cm, greater than or equal to 8 cm, greater than or equal to 10 cm, greater than or equal to 12.5 cm, greater than or equal to 15 cm, greater than or equal to 20 cm, greater than or equal to 25 cm, greater than or equal to 30 cm, greater than or equal to 40 cm, greater than or equal to 50 cm, greater than or equal to 60 cm, greater than or equal to 70 cm, greater than or equal to 75 cm, greater than or equal to 80 cm, greater than or equal to 90 cm, greater than or equal to 100 cm, greater than or equal to 125 cm, greater than or equal to 150 cm, or greater than or equal to 175 cm. In some embodiments, the average length and/or end-to-end distance of the embossments is less than or equal to 200 cm, less than or equal to 175 cm, less than or equal to 150 cm, less than or equal to 125 cm, less than or equal to 100 cm, less than or equal to 90 cm, less than or equal to 80 cm, less than or equal to 75 cm, less than or equal to 70 cm, less than or equal to 60 cm, less than or equal to 50 cm, less than or equal to 40 cm, less than or equal to 30 cm, less than or equal to 25 cm, less than or equal to 20 cm, less than or equal to 15 cm, less than or equal to 12.5 cm, less than or equal to 10 cm, less than or equal to 8 cm, less than or equal to 6 cm, less than or equal to 5 cm, less than or equal to 4.5 cm, less than or equal to 4.25 cm, less than or equal to 4 cm, less than or equal to 3.75 cm, less than or equal to 3.5 cm, less than or equal to 3.25 cm, less than or equal to 3 cm, less than or equal to 2.75 cm, less than or equal to 2.5 cm, or less than or equal to 2.25 cm. Combinations of the above-referenced ranges are also possible (e.g., greater than or equal to 2 cm and less than or equal to 200 cm, greater than or equal to 2 cm and less than or equal to 100 cm, greater than or equal to 3 cm and less than or equal to 75 cm, or greater than or equal to 4 cm and less than or equal to 50 cm). Other ranges are also possible.

Figure 10:
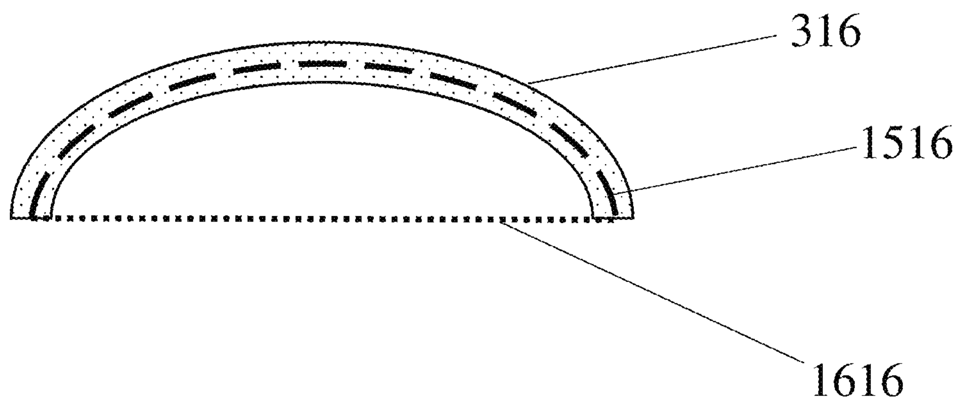
FIGS. 10-11 shows two non-limiting examples of embossments, in accordance with some embodiments.

As used herein, the "length" of an embossment refers to the path length of the embossment along its center (e.g., with reference to the embossment 316 shown in FIG. 10, the length of the arc 1516). As also used herein, the "end-to-end distance" of an embossment refers to the length of the straight line segment connecting the centers of the ends of the embossment (e.g., with reference to the embossment 316 shown in FIG. 10, the length of the line segment 1616).

When present, the embossments may have a variety of suitable average frequencies. In some embodiments, the average frequency of the embossments is greater than or equal to 5 embossments/m, greater than or equal to 6 embossments/m, greater than or equal to 7 embossments/m, greater than or equal to 9 embossments/m, greater than or equal to 10 embossments/m, greater than or equal to 12 embossments/m, greater than or equal to 15 embossments/m, greater than or equal to 17.5 embossments/m, greater than or equal to 20 embossments/m, greater than or equal to 25 embossments/m, greater than or equal to 30 embossments/m, greater than or equal to 40 embossments/m, greater than or equal to 50 embossments/m, greater than or equal to 75 embossment/m, greater than or equal to 100 embossments/m, greater than or equal to 125 embossments/m, greater than or equal to 150 embossments/m, greater than or equal to 175 embossments/m, greater than or equal to 200 embossments/m, greater than or equal to 225 embossments/m, greater than or equal to 250 embossments/m, or greater than or equal to 275 embossments/m. In some embodiments, the average frequency of the embossments is less than or equal to 300 embossments/m, less than or equal to 275 embossments/m, less than or equal to 250 embossments/m, less than or equal to 225 embossments/m, less than or equal to 200 embossments/m, less than or equal to 175 embossments/m, less than or equal to 150 embossments/m, less than or equal to 125 embossments/m, less than or equal to 100 embossments/m, less than or equal to 75 embossments/m, less than or equal to 50 embossments/m, less than or equal to 40 embossments/m, less than or equal to 30 embossments/m, less than or equal to 25 embossments/m, less than or equal to 20 embossments/m, less than or equal to 17.5 embossments/m, less than or equal to 15 embossments/m, less than or equal to 12 embossments/m, less than or equal to 10 embossments/m, less than or equal to 9 embossments/m, less than or equal to 7 embossments/m, or less than or equal to 6 embossments/m. Combinations of the above-referenced ranges are also possible (e.g., greater than or equal to 5 embossments/m and less than or equal to 300 embossments/m, greater than or equal to 10 embossments/m, and less than or equal to 200 embossments/m, or greater than or equal to 15 embossments/m and less than or equal to 150 embossments/m). Other ranges are also possible.

Battery separators may comprise a plurality of embossments having an average frequency in one or more of the above-referenced ranges in a variety of directions. As one example, in some embodiments, a battery separator comprises a plurality of embossments having an average frequency in one or more of the above-referenced ranges in a direction perpendicular to one of, a portion of, the majority of, and/or all of the embossments in the plurality of embossments. As another example, in some embodiments, a battery separator comprises a plurality of embossments having an average frequency in one or more of the above-referenced ranges in a direction parallel to the machine direction of the battery separator. As a third example, in some embodiments, a battery separator comprises a plurality of embossments having an average frequency in one or more of the above-referenced ranges in a direction parallel to the cross direction of the battery separator. The average frequency of embossments in a particular direction may be determined by: (1) drawing a straight line segment across the battery separator in the relevant direction; (2) determining the number of intersections between embossments and the line segment; (3) determining the length of the line segment; (4) dividing the number of intersections between embossments and the line segment by the length of the line segment; (5) repeating steps (1)-(4) for every possible line segment that may be drawn across the battery separator in the relevant direction; and (6) averaging the values found in step (5).

When present, the embossments may form a variety of suitable angles with respect to the machine direction. In some embodiments, the embossments form an angle with the machine direction of greater than or equal to 0°, greater than or equal to 1°, greater than or equal to 2°, greater than or equal to 5°, greater than or equal to 7.5°, greater than or equal to 10°, greater than or equal to 12.5°, greater than or equal to 15°, greater than or equal to 17.5°, greater than or equal to 20°, greater than or equal to 22.5°, greater than or equal to 25°, greater than or equal to 27.5°, greater than or equal to 30°, greater than or equal to 35°, greater than or equal to 40°, greater than or equal to 45°, greater than or equal to 50°, greater than or equal to 55°, greater than or equal to 60°, greater than or equal to 65°, greater than or equal to 70°, greater than or equal to 75°, greater than or equal to 80°, or greater than or equal to 85°. In some embodiments, the embossments form an angle with the machine direction of less than or equal to 90°, less than or equal to 85°, less than or equal to 80°, less than or equal to 75°, less than or equal to 70°, less than or equal to 65°, less than or equal to 60°, less than or equal to 55°, less than or equal to 50°, less than or equal to 45°, less than or equal to 40°, less than or equal to 35°, less than or equal to 27.5°, less than or equal to 25°, less than or equal to 22.5°, less than or equal to 20°, less than or equal to 17.5°, less than or equal to 15°, less than or equal to 12.5°, less than or equal to 10°, less than or equal to 7.5°, less than or equal to 5°, less than or equal to 2°, or less than or equal to 1° with the machine direction. Combinations of the above-referenced ranges are also possible (e.g., greater than or equal to 0° and less than or equal to 90°, greater than or equal to 10° and less than or equal to 80°, or greater than or equal to 20° and less than or equal to) 70°. Other ranges are also possible.

Figure 11:
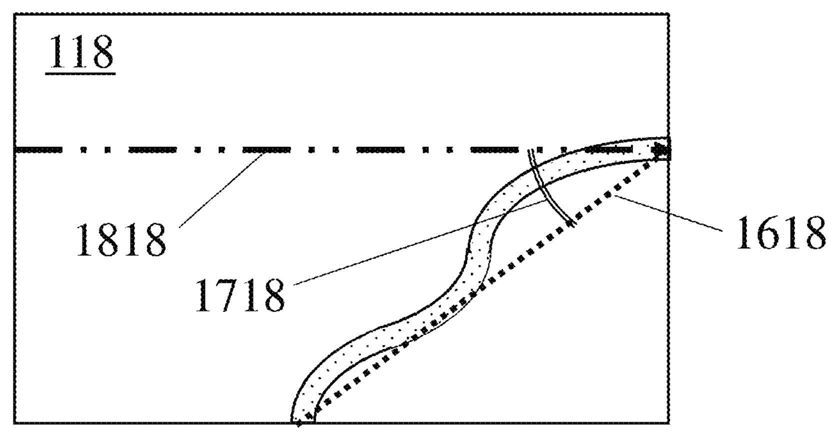

In some embodiments, the angle between the machine direction and the embossments is determined with respect to the angle between the direction along which the embossments' end-to-end distance is measured and the machine direction. In other words, in some embodiments, the straight line segment that connects the centers of the ends of the embossments intersects the machine direction at an angle in one or more of the above-referenced ranges. With reference to FIG. 11, in some embodiments, the angle 1718 at which the line segment 1618 intersects the machine direction 1818 is within one or more of the above-referenced ranges.

Embossments in the battery separators and/or layers thereof (e.g., fiber webs, such as non-woven fiber webs) described herein may be formed by embossing. Several different techniques may be used to emboss the separator and/or layer. For example, pressure may be applied to the separator and/or layer using a roll system to form surface features (e.g., indentations) having a specific pattern. In some instances, a layer to be embossed may be formed on a wire (e.g., inclined table, flat table, rotoformer, round former) that has a mesh pattern. Deposition of the materials forming the layer onto the mesh pattern may result in the formation of zones with more or less pulp and, accordingly, may produce an uneven thickness profile (e.g., indentations) across the final layer. In some such embodiments, the indentations may be in the form of a mesh pattern. To form an embossed wet laid layer, a dandy roll having a defined pattern can be applied to the layer when in the wet stage.

The layers that may be employed in the battery separators described herein, such as layers that may comprise a plurality of embossments, may comprise fibers. For instance, in some embodiments, a battery separator comprises one or more layers that each are and/or comprise a fiber web, such as a non-woven fiber web. Non-limiting examples of suitable non-woven fiber webs include wet laid non-woven fiber webs and non-wet laid non-woven fiber webs. Further detail regarding the fiber types that may be incorporated in such layers are provided below.

Layers (e.g., fiber webs) suitable for inclusion in the battery separators described herein may comprise glass fibers. The glass fibers may make up greater than or equal to 50 wt %, greater than or equal to 60 wt %, greater than or equal to 70 wt %, greater than or equal to 80 wt %, greater than or equal to 90 wt %, greater than or equal to 95 wt %, or greater than or equal to 99 wt % of the layer, fiber web, and/or battery separator. The glass fibers may make up less than or equal to 100 wt %, less than or equal to 99 wt %, less than or equal to 95 wt %, less than or equal to 90 wt %, less than or equal to 80 wt %, less than or equal to 70 wt %, or less than or equal to 60 wt % of the layer, fiber web, and/or battery separator. Combinations of the above-referenced ranges are also possible (e.g., greater than or equal to 50 wt % and less than or equal to 100 wt %, greater than or equal to 70 wt % and less than or equal to 100 wt %, or greater than or equal to 80 wt % and less than or equal to 100 wt %). Other ranges are also possible. In some embodiments, glass fibers make up 100 wt % of the layer, fiber web, and/or battery separator.

A battery separator may comprise an amount of glass fibers in one or more of the ranges described above and/or one or more layers (e.g., one or more fiber webs, such as an embossed layer described herein) in a battery separator may each independently comprise an amount of glass fibers in one or more of the ranges described above. In one set of embodiments, an embossed layer described herein comprises an amount of glass fibers in one or more of the ranges described above.

When present, the glass fibers in a layer (e.g., a fiber web) and/or battery separator may have a variety of suitable average diameters. In some embodiments, a layer, fiber web, and/or battery separator comprises glass fibers having an average diameter of greater than or equal to 0.5 microns, greater than or equal to 0.55 microns, greater than or equal to 0.6 microns, greater than or equal to 0.65 microns, greater than or equal to 0.7 microns, greater than or equal to 0.75 microns, greater than or equal to 0.8 microns, greater than or equal to 0.9 microns, greater than or equal to 1 micron, greater than or equal to 1.5 microns, greater than or equal to 2 microns, greater than or equal to 2.5 microns, greater than or equal to 3 microns, greater than or equal to 4 microns, greater than or equal to 5 microns, greater than or equal to 6 microns, greater than or equal to 8 microns, greater than or equal to 10 microns, greater than or equal to 12.5 microns, greater than or equal to 15 microns, or greater than or equal to 17.5 microns. In some embodiments, a layer, fiber web, and/or battery separator comprises glass fibers having an average diameter of less than or equal to 20 microns, less than or equal to 17.5 microns, less than or equal to 15 microns, less than or equal to 12.5 microns, less than or equal to 10 microns, less than or equal to 8 microns, less than or equal to 6 microns, less than or equal to 5 microns, less than or equal to 4 microns, less than or equal to 3 microns, less than or equal to 2.5 microns, less than or equal to 2 microns, less than or equal to 1.5 microns, less than or equal to 1 micron, less than or equal to 0.9 microns, less than or equal to 0.8 microns, less than or equal to 0.75 microns, less than or equal to 0.7 microns, less than or equal to 0.65 microns, less than or equal to 0.6 microns, or less than or equal to 0.55 microns. Combinations of the above-referenced ranges are also possible (e.g., greater than or equal to 0.5 microns and less than or equal to 10 microns, greater than or equal to 0.6 microns and less than or equal to 5 microns, or greater than or equal to 0.7 microns and less than or equal to 4 microns). Other ranges are also possible.

A battery separator may comprise glass fibers having an average diameter in one or more of the ranges described above and/or one or more layers (e.g., one or more fiber webs, such as an embossed layer described herein) in a battery separator may each independently comprise glass fibers having an average diameter in one or more of the ranges described above. In one set of embodiments, an embossed layer described herein comprises glass fibers having an average diameter in one or more of the ranges described above.

When present, the glass fibers in a layer, fiber web, and/or battery separator may have a variety of suitable average lengths. In some embodiments, a layer, fiber web, and/or battery separator comprises glass fibers having an average length of greater than or equal to 0.1 mm, greater than or equal to 0.125 mm, greater than or equal to 0.15 mm, greater than or equal to 0.2 mm, greater than or equal to 0.25 mm, greater than or equal to 0.3 mm, greater than or equal to 0.4 mm, greater than or equal to 0.5 mm, greater than or equal to 0.75 mm, greater than or equal to 1 mm, greater than or equal to 2 mm, greater than or equal to 3 mm, greater than or equal to 4 mm, greater than or equal to 5 mm, greater than or equal to 6 mm, greater than or equal to 8 mm, greater than or equal to 10 mm, greater than or equal to 12.5 mm, greater than or equal to 15 mm, or greater than or equal to 17.5 mm. In some embodiments, a layer, fiber web, and/or battery separator comprises glass fibers having an average length of less than or equal to 20 mm, less than or equal to 17.5 mm, less than or equal to 15 mm, less than or equal to 12.5 mm, less than or equal to 10 mm, less than or equal to 8 mm, less than or equal to 6 mm, less than or equal to 5 mm, less than or equal to 4 mm, less than or equal to 3 mm, less than or equal to 2 mm, less than or equal to 1 mm, less than or equal to 0.75 mm, less than or equal to 0.5 mm, less than or equal to 0.4 mm, less than or equal to 0.3 mm, less than or equal to 0.25 mm, less than or equal to 0.2 mm, less than or equal to 0.15 mm, or less than or equal to 0.125 mm. Combinations of the above-referenced ranges are also possible (e.g., greater than or equal to 0.1 mm and less than or equal to 20 mm, greater than or equal to 0.15 mm and less than or equal to 10 mm, or greater than or equal to 0.2 mm and less than or equal to 5 mm). Other ranges are also possible.

A battery separator may comprise glass fibers having an average length in one or more of the ranges described above and/or one or more layers (e.g., one or more fiber webs, such as an embossed layer described herein) in a battery separator may each independently comprise glass fibers having an average length in one or more of the ranges described above. In one set of embodiments, an embossed layer described herein comprises glass fibers having an average length in one or more of the ranges described above.

Some layers (e.g., some fiber webs) suitable for inclusion in the battery separators described herein comprise glass fibers that are microglass fibers. The microglass fibers may comprise fibers produced by drawing a melt of glass from brushing tips into continuous fibers and then subjecting the continuous fibers to a flame blowing process and/or a rotary spinning process. It is also possible for the microglass fibers to comprise fibers formed by a remelting process.

Microglass fibers present in the layers, fiber webs, and/or battery separators described herein may make up a variety of suitable amounts thereof. In some embodiments, microglass fibers make up greater than or equal to 50 wt %, greater than or equal to 52.5 wt %, greater than or equal to 55 wt %, greater than or equal to 57.5 wt %, greater than or equal to 60 wt %, greater than or equal to 62.5 wt %, greater than or equal to 65 wt %, greater than or equal to 67.5 wt %, greater than or equal to 70 wt %, greater than or equal to 72.5 wt %, greater than or equal to 75 wt %, greater than or equal to 77.5 wt %, greater than or equal to 80 wt %, greater than or equal to 82.5 wt %, greater than or equal to 85 wt %, greater than or equal to 87.5 wt %, greater than or equal to 90 wt %, greater than or equal to 92.5 wt %, greater than or equal to 95 wt %, or greater than or equal to 97.5 wt % of the layer, fiber web, and/or battery separator. In some embodiments, microglass fibers make up less than or equal to 100 wt %, less than or equal to 97.5 wt %, less than or equal to 95 wt %, less than or equal to 92.5 wt %, less than or equal to 90 wt %, less than or equal to 87.5 wt %, less than or equal to 85 wt %, less than or equal to 82.5 wt %, less than or equal to 80 wt %, less than or equal to 77.5 wt %, less than or equal to 75 wt %, less than or equal to 72.5 wt %, less than or equal to 70 wt %, less than or equal to 67.5 wt %, less than or equal to 65 wt %, less than or equal to 62.5 wt %, less than or equal to 60 wt %, less than or equal to 57.5 wt %, less than or equal to 55 wt %, or less than or equal to 52.5 wt % of the layer, fiber web, and/or battery separator. Combinations of the above-referenced ranges are also possible (e.g., greater than or equal to 50 wt % and less than or equal to 100 wt %, greater than or equal to 60 wt % and less than or equal to 95 wt %, or greater than or equal to 70 wt % and less than or equal to 90 wt %). Other ranges are also possible.

A battery separator may comprise an amount of microglass fibers in one or more of the ranges described above and/or one or more layers (e.g., one or more fiber webs, such as an embossed layer described herein) in a battery separator may each independently comprise an amount of microglass fibers in one or more of the ranges described above. In one set of embodiments, an embossed layer described herein comprises an amount of microglass fibers in one or more of the ranges described above.

When present, the microglass fibers in a layer, fiber web, and/or battery separator may have a variety of suitable average diameters. In some embodiments, a layer, fiber web, and/or battery separator comprises microglass fibers having an average diameter of greater than or equal to 0.3 microns, greater than or equal to 0.4 microns, greater than or equal to 0.5 microns, greater than or equal to 0.6 microns, greater than or equal to 0.7 microns, greater than or equal to 0.8 microns, greater than or equal to 0.9 microns, greater than or equal to 1 micron, greater than or equal to 1.25 microns, greater than or equal to 1.5 microns, greater than or equal to 1.75 microns, greater than or equal to 2 microns, greater than or equal to 2.25 microns, greater than or equal to 2.5 microns, greater than or equal to 2.75 microns, greater than or equal to 3 microns, greater than or equal to 3.5 microns, greater than or equal to 4 microns, or greater than or equal to 4.5 microns. In some embodiments, a layer, fiber web, and/or battery separator comprises microglass fibers having an average diameter of less than or equal to 5 microns, less than or equal to 4.5 microns, less than or equal to 4 microns, less than or equal to 3.5 microns, less than or equal to 3 microns, less than or equal to 2.75 microns, less than or equal to 2.5 microns, less than or equal to 2.25 microns, less than or equal to 2 microns, less than or equal to 1.75 microns, less than or equal to 1.5 microns, less than or equal to 1.25 microns, less than or equal to 1 micron, less than or equal to 0.9 microns, less than or equal to 0.8 microns, less than or equal to 0.7 microns, less than or equal to 0.6 microns, less than or equal to 0.5 microns, or less than or equal to 0.4 microns. Combinations of the above-referenced ranges are also possible (e.g., greater than or equal to 0.3 microns and less than or equal to 5 microns, greater than or equal to 0.5 microns and less than or equal to 3 microns, or greater than or equal to 0.7 microns and less than or equal to 2 microns). Other ranges are also possible.

A battery separator may comprise microglass fibers having an average diameter in one or more of the ranges described above and/or one or more layers (e.g., one or more fiber webs, such as an embossed layer described herein) in a battery separator may each independently comprise microglass fibers having an average diameter in one or more of the ranges described above. In one set of embodiments, an embossed layer described herein comprises microglass fibers having an average diameter in one or more of the ranges described above.

When present, the microglass fibers in a layer, fiber web, and/or battery separator may have a variety of suitable average lengths. In some embodiments, a fiber web and/or battery separator comprises microglass fibers having an average length of greater than or equal to 0.1 mm, greater than or equal to 0.125 mm, greater than or equal to 0.15 mm, greater than or equal to 0.175 mm, greater than or equal to 0.2 mm, greater than or equal to 0.25 mm, greater than or equal to 0.3 mm, greater than or equal to 0.35 mm, greater than or equal to 0.4 mm, greater than or equal to 0.45 mm, greater than or equal to 0.5 mm, greater than or equal to 0.55 mm, greater than or equal to 0.6 mm, greater than or equal to 0.65 mm, greater than or equal to 0.7 mm, or greater than or equal to 0.75 mm. In some embodiments, a layer, fiber web, and/or battery separator comprises microglass fibers having an average length of less than or equal to 0.8 mm, less than or equal to 0.75 mm, less than or equal to 0.7 mm, less than or equal to 0.65 mm, less than or equal to 0.6 mm, less than or equal to 0.55 mm, less than or equal to 0.5 mm, less than or equal to 0.45 mm, less than or equal to 0.4 mm, less than or equal to 0.35 mm, less than or equal to 0.3 mm, less than or equal to 0.25 mm, less than or equal to 0.2 mm, less than or equal to 0.175 mm, less than or equal to 0.15 mm, or less than or equal to 0.125 mm. Combinations of the above-referenced ranges are also possible (e.g., greater than or equal to 0.1 mm and less than or equal to 0.8 mm, greater than or equal to 0.15 mm and less than or equal to 0.6 mm, or greater than or equal to 0.2 mm and less than or equal to 0.4 mm). Other ranges are also possible.

A battery separator may comprise microglass fibers having an average length in one or more of the ranges described above and/or one or more layers (e.g., one or more fiber webs, such as an embossed layer described herein) in a battery separator may each independently comprise microglass fibers having an average length in one or more of the ranges described above. In one set of embodiments, an embossed layer described herein comprises microglass fibers having an average length in one or more of the ranges described above.

Some layers (e.g., some fiber webs) suitable for inclusion in the battery separators described herein comprise glass fibers that are chopped strand glass fibers (e.g., in addition to microglass fibers, or instead of microglass fibers). The chopped strand glass fibers may comprise fibers produced by drawing a melt of glass from bushing tips into continuous fibers and then cutting the continuous fibers into short fibers. In some embodiments, a layer, fiber web, and/or battery separator comprises chopped strand glass fibers for which alkali metal oxides (e.g., sodium oxides, magnesium oxides) make up a relatively low amount thereof. It is also possible for a layer, fiber web, and/or battery separator to comprise chopped strand glass fibers that include relatively large amounts of calcium oxide and/or alumina.

Chopped strand glass fibers present in the layers, fiber webs, and battery separators described herein may make up a variety of suitable amounts thereof. In some embodiments, chopped strand glass fibers make up greater than or equal to 0 wt %, greater than or equal to 0.1 wt %, greater than or equal to 0.2 wt %, greater than or equal to 0.5 wt %, greater than or equal to 0.75 wt %, greater than or equal to 1 wt %, greater than or equal to 1.25 wt %, greater than or equal to 1.5 wt %, greater than or equal to 1.75 wt %, greater than or equal to 2 wt %, greater than or equal to 2.25 wt %, greater than or equal to 2.5 wt %, greater than or equal to 2.75 wt %, greater than or equal to 3 wt %, greater than or equal to 3.5 wt %, greater than or equal to 4 wt %, greater than or equal to 5 wt %, greater than or equal to 7.5 wt %, greater than or equal to 10 wt %, greater than or equal to 12.5 wt %, greater than or equal to 15 wt %, greater than or equal to 17.5 wt %, greater than or equal to 20 wt %, greater than or equal to 22.5 wt %, greater than or equal to 25 wt %, greater than or equal to 30 wt %, or greater than or equal to 35 wt % of the layer, fiber web, and/or battery separator. In some embodiments, chopped strand glass fibers make up less than or equal to 40 wt %, less than or equal to 35 wt %, less than or equal to 30 wt %, less than or equal to 25 wt %, less than or equal to 22.5 wt %, less than or equal to 20 wt %, less than or equal to 17.5 wt %, less than or equal to 15 wt %, less than or equal to 12.5 wt %, less than or equal to 10 wt %, less than or equal to 7.5 wt %, less than or equal to 5 wt %, less than or equal to 4 wt %, less than or equal to 3.5 wt %, less than or equal to 3 wt %, less than or equal to 2.75 wt %, less than or equal to 2.5 wt %, less than or equal to 2.25 wt %, less than or equal to 2 wt %, less than or equal to 1.75 wt %, less than or equal to 1.5 wt %, less than or equal to 1.25 wt %, less than or equal to 1 wt %, less than or equal to 0.75 wt %, less than or equal to 0.5 wt %, less than or equal to 0.2 wt %, or less than or equal to 0.1 wt % of the layer, fiber web, and/or battery separator. Combinations of the above-referenced ranges are also possible (e.g., greater than or equal to 0 wt % and less than or equal to 40 wt %, greater than or equal to 2 wt % and less than or equal to 20 wt %, or greater than or equal to 3 wt % and less than or equal to 15 wt %). Other ranges are also possible.

A battery separator may comprise an amount of chopped strand glass fibers in one or more of the ranges described above and/or one or more layers (e.g., one or more fiber webs, such as an embossed layer described herein) in a battery separator may each independently comprise an amount of chopped strand glass fibers in one or more of the ranges described above. In one set of embodiments, an embossed layer described herein comprises an amount of chopped strand glass fibers in one or more of the ranges described above.

When present, the chopped strand glass fibers in a layer, fiber web, and/or battery separator may have a variety of suitable average diameters. In some embodiments, a layer, fiber web, and/or battery separator comprises chopped strand glass fibers having an average diameter of greater than or equal to 5 microns, greater than or equal to 5.5 microns, greater than or equal to 6 microns, greater than or equal to 6.5 microns, greater than or equal to 7 microns, greater than or equal to 7.5 microns, greater than or equal to 8 microns, greater than or equal to 8.5 microns, greater than or equal to 9 microns, greater than or equal to 10 microns, greater than or equal to 12.5 microns, greater than or equal to 15 microns, greater than or equal to 17.5 microns, greater than or equal to 20 microns, or greater than or equal to 22.5 microns. In some embodiments, a layer, fiber web, and/or battery separator comprises chopped strand glass fibers having an average diameter of less than or equal to 25 microns, less than or equal to 22.5 microns, less than or equal to 20 microns, less than or equal to 17.5 microns, less than or equal to 15 microns, less than or equal to 12.5 microns, less than or equal to 10 microns, less than or equal to 9 microns, less than or equal to 8.5 microns, less than or equal to 8 microns, less than or equal to 7.5 microns, less than or equal to 7 microns, less than or equal to 6.5 microns, less than or equal to 6 microns, or less than or equal to 5.5 microns. Combinations of the above-referenced ranges are also possible (e.g., greater than or equal to 5 microns and less than or equal to 25 microns, greater than or equal to 7 microns and less than or equal to 20 microns, or greater than or equal to 8 microns and less than or equal to 15 microns). Other ranges are also possible.

A battery separator may comprise chopped strand glass fibers having an average diameter in one or more of the ranges described above and/or one or more layers (e.g., one or more fiber webs, such as an embossed layer described herein) in a battery separator may each independently comprise chopped strand glass fibers having an average diameter in one or more of the ranges described above. In one set of embodiments, an embossed layer described herein comprises chopped strand glass fibers having an average diameter in one or more of the ranges described above.

When present, the chopped strand glass fibers in a layer, fiber web, and/or battery separator may have a variety of suitable average lengths. In some embodiments, a layer, fiber web, and/or battery separator comprises and/or battery separator chopped strand glass fibers having an average length of greater than or equal to 2 mm, greater than or equal to 2.5 mm, greater than or equal to 3 mm, greater than or equal to 3.5 mm, greater than or equal to 4 mm, greater than or equal to 4.5 mm, greater than or equal to 5 mm, greater than or equal to 5.5 mm, greater than or equal to 6 mm, greater than or equal to 6.5 mm, greater than or equal to 7 mm, greater than or equal to 8 mm, greater than or equal to 10 mm, greater than or equal to 12.5 mm, greater than or equal to 15 mm, greater than or equal to 17.5 mm, greater than or equal to 20 mm, or greater than or equal to 22.5 mm. In some embodiments, a layer, fiber web, and/or battery separator comprises chopped strand glass fibers having an average length of less than or equal to 25 mm, less than or equal to 22.5 mm, less than or equal to 20 mm, less than or equal to 17.5 mm, less than or equal to 15 mm, less than or equal to 12.5 mm, less than or equal to 10 mm, less than or equal to 8 mm, less than or equal to 7 mm, less than or equal to 6.5 mm, less than or equal to 6 mm, less than or equal to 5.5 mm, less than or equal to 5 mm, less than or equal to 4.5 mm, less than or equal to 3.5 mm, less than or equal to 3 mm, or less than or equal to 2.5 mm. Combinations of the above-referenced ranges are also possible (e.g., greater than or equal to 2 mm and less than or equal to 25 mm, greater than or equal to 4 mm and less than or equal to 20 mm, or greater than or equal to 6 mm and less than or equal to 15 mm). Other ranges are also possible.

A battery separator may comprise chopped strand glass fibers having an average length in one or more of the ranges described above and/or one or more layers (e.g., one or more fiber webs, such as an embossed layer described herein) in a battery separator may each independently comprise chopped strand glass fibers having an average length in one or more of the ranges described above. In one set of embodiments, an embossed layer described herein comprises chopped strand glass fibers having an average length in one or more of the ranges described above.

Layers (e.g., fiber webs) suitable for inclusion in the battery separators described herein may comprise synthetic fibers. The synthetic fibers may comprise one or more of a variety of types of synthetic materials. For instance, in some embodiments, a layer, fiber web, and/or battery separator comprises synthetic fibers comprising a poly(olefin) (e.g., poly(propylene), poly(ethylene)), an acrylic (e.g., a dryspun acrylic, a modacrylic, a wetspun acrylic), a halogenated polymer (e.g., a fluorinated polymer, such as poly(vinyl chloride), poly(tetrafluoroethylene), and/or poly(vinylidine fluoride)), poly(styrene), poly(sulfone), poly(ethersulfone), a poly(carbonate), a nylon, a poly(urethane), a phenolic resin, a poly(ester), a poly(aramid) (e.g., a para-poly(aramid), a meta-poly(aramid), Kevlar, Nomex), a poly(imide), poly(phenylene oxide), poly(phenylene sulfide), poly(methyl pentene), poly(ether ketone), a liquid crystal polymer (e.g., poly(p-phenylene-2,6-benzobisoxazole; a poly(ester)-based liquid crystal polymer, such as a polymer produced by the polycondensation of 4-hydroxybenzoic acid and 6-hydroxynaphthalene-2-carboxylic acid), regenerated cellulose, celluloid, cellulose acetate, and/or carboxymethylcellulose.

When present, the synthetic fibers may make up greater than or equal to 0 wt %, greater than or equal to 1 wt %, greater than or equal to 2 wt %, greater than or equal to 3 wt %, greater than or equal to 4 wt %, greater than or equal to 5 wt %, greater than or equal to 7.5 wt %, greater than or equal to 10 wt %, greater than or equal to 12.5 wt %, greater than or equal to 15 wt %, greater than or equal to 17.5 wt %, greater than or equal to 20 wt %, greater than or equal to 22.5 wt %, greater than or equal to 25 wt %, greater than or equal to 27.5 wt %, greater than or equal to 30 wt %, greater than or equal to 32.5 wt %, greater than or equal to 35 wt %, or greater than or equal to 37.5 wt % of the layer, fiber web, and/or battery separator. The synthetic fibers may make up less than or equal to 40 wt %, less than or equal to 37.5 wt %, less than or equal to 35 wt %, less than or equal to 32.5 wt %, less than or equal to 30 wt %, less than or equal to 27.5 wt %, less than or equal to 25 wt %, less than or equal to 22.5 wt %, less than or equal to 20 wt %, less than or equal to 17.5 wt %, less than or equal to 15 wt %, less than or equal to 12.5 wt %, less than or equal to 10 wt %, less than or equal to 7.5 wt %, less than or equal to 5 wt %, less than or equal to 4 wt %, less than or equal to 3 wt %, less than or equal to 2 wt %, or less than or equal to 1 wt % of the layer, fiber web, and/or battery separator. Combinations of the above-referenced ranges are also possible (e.g., greater than or equal to 0 wt % and less than or equal to 40 wt %, greater than or equal to 3 wt % and less than or equal to 30 wt %, or greater than or equal to 5 wt % and less than or equal to 20 wt %). Other ranges are also possible.

A battery separator may comprise an amount of synthetic fibers in one or more of the ranges described above and/or one or more layers (e.g., one or more fiber webs, such as an embossed layer described herein) in a battery separator may each independently comprise an amount of synthetic fibers in one or more of the ranges described above. In one set of embodiments, an embossed layer described herein comprises an amount of synthetic fibers in one or more of the ranges described above.

When present, the synthetic fibers in a layer, fiber web, and/or battery separator may have a variety of suitable average diameters. In some embodiments, a layer, fiber web, and/or battery separator comprises synthetic fibers having an average diameter of greater than or equal to 3 microns, greater than or equal to 3.5 microns, greater than or equal to 4 microns, greater than or equal to 4.5 microns, greater than or equal to 5 microns, greater than or equal to 5.5 microns, greater than or equal to 6 microns, greater than or equal to 6.5 microns, greater than or equal to 7 microns, greater than or equal to 7.5 microns, greater than or equal to 8 microns, greater than or equal to 9 microns, greater than or equal to 10 microns, greater than or equal to 12.5 microns, greater than or equal to 15 microns, greater than or equal to 17.5 microns, greater than or equal to 20 microns, greater than or equal to 22.5 microns, greater than or equal to 25 microns, or greater than or equal to 27.5 microns. In some embodiments, a layer, fiber web, and/or battery separator comprises synthetic fibers having an average diameter of less than or equal to 30 microns, less than or equal to 27.5 microns, less than or equal to 25 microns, less than or equal to 22.5 microns, less than or equal to 20 microns, less than or equal to 17.5 microns, less than or equal to 15 microns, less than or equal to 12.5 microns, less than or equal to 10 microns, less than or equal to 9 microns, less than or equal to 8 microns, less than or equal to 7.5 microns, less than or equal to 7 microns, less than or equal to 6.5 microns, less than or equal to 6 microns, less than or equal to 5.5 microns, less than or equal to 5 microns, less than or equal to 4.5 microns, less than or equal to 4 microns, or less than or equal to 3.5 microns. Combinations of the above-referenced ranges are also possible (e.g., greater than or equal to 3 microns and less than or equal to 30 microns, greater than or equal to 5 microns and less than or equal to 25 microns, or greater than or equal to 7 microns and less than or equal to 20 microns). Other ranges are also possible.

A battery separator may comprise synthetic fibers having an average diameter in one or more of the ranges described above and/or one or more layers (e.g., one or more fiber webs, such as an embossed layer described herein) in a battery separator may each independently comprise synthetic fibers having an average diameter in one or more of the ranges described above. In one set of embodiments, an embossed layer described herein comprises synthetic fibers having an average diameter in one or more of the ranges described above.

When present, the synthetic fibers in a layer, fiber web, and/or battery separator may have a variety of suitable average lengths. In some embodiments, a layer, fiber web, and/or battery separator comprises synthetic fibers that are non-continuous, such as staple fibers. A layer, fiber web, and/or battery separator may comprise synthetic fibers having an average length of greater than or equal to 2 mm, greater than or equal to 2.5 mm, greater than or equal to 3 mm, greater than or equal to 3.5 mm, greater than or equal to 4 mm, greater than or equal to 4.5 mm, greater than or equal to 5 mm, greater than or equal to 5.5 mm, greater than or equal to 6 mm, greater than or equal to 6.5 mm, greater than or equal to 7 mm, greater than or equal to 8 mm, greater than or equal to 10 mm, greater than or equal to 12.5 mm, greater than or equal to 15 mm, greater than or equal to 17.5 mm, greater than or equal to 20 mm, or greater than or equal to 22.5 mm. In some embodiments, a layer, fiber web, and/or battery separator comprises synthetic fibers having an average length of less than or equal to 25 mm, less than or equal to 22.5 mm, less than or equal to 20 mm, less than or equal to 17.5 mm, less than or equal to 15 mm, less than or equal to 12.5 mm, less than or equal to 10 mm, less than or equal to 8 mm, less than or equal to 7 mm, less than or equal to 6.5 mm, less than or equal to 6 mm, less than or equal to 5.5 mm, less than or equal to 5 mm, less than or equal to 4.5 mm, less than or equal to 4 mm, less than or equal to 3.5 mm, less than or equal to 3 mm, or less than or equal to 2.5 mm. Combinations of the above-referenced ranges are also possible (e.g., greater than or equal to 2 mm and less than or equal to 25 mm, greater than or equal to 4 mm and less than or equal to 20 mm, or greater than or equal to 6 mm and less than or equal to 15 mm). Other ranges are also possible.

A battery separator may comprise synthetic fibers having an average length in one or more of the ranges described above and/or one or more layers (e.g., one or more fiber webs, such as an embossed layer described herein) in a battery separator may each independently comprise synthetic fibers having an average length in one or more of the ranges described above. In one set of embodiments, an embossed layer described herein comprises synthetic fibers having an average length in one or more of the ranges described above.

Some layers (e.g., some fiber webs) suitable for inclusion in the battery separators described herein comprise synthetic fibers that are monocomponent synthetic fibers. Such monocomponent synthetic fibers may comprise binder fibers and/or non-binder fibers.

When present, the monocomponent synthetic fibers may make up greater than or equal to 0 wt %, greater than or equal to 0.5 wt %, greater than or equal to 1 wt %, greater than or equal to 1.5 wt %, greater than or equal to 2 wt %, greater than or equal to 2.5 wt %, greater than or equal to 3 wt %, greater than or equal to 3.5 wt %, greater than or equal to 4 wt %, greater than or equal to 4.5 wt %, greater than or equal to 5 wt %, greater than or equal to 5.5 wt %, greater than or equal to 6 wt %, greater than or equal to 7 wt %, greater than or equal to 8 wt %, greater than or equal to 10 wt %, greater than or equal to 12.5 wt %, greater than or equal to 15 wt %, greater than or equal to 17.5 wt %, greater than or equal to 20 wt %, greater than or equal to 22.5 wt %, greater than or equal to 25 wt %, greater than or equal to 27.5 wt %, greater than or equal to 30 wt %, greater than or equal to 32.5 wt %, greater than or equal to 35 wt %, or greater than or equal to 37.5 wt % of the layer, fiber web, and/or battery separator. The monocomponent synthetic fibers may make up less than or equal to 40 wt %, less than or equal to 37.5 wt %, less than or equal to 35 wt %, less than or equal to 32.5 wt %, less than or equal to 30 wt %, less than or equal to 27.5 wt %, less than or equal to 25 wt %, less than or equal to 22.5 wt %, less than or equal to 20 wt %, less than or equal to 17.5 wt %, less than or equal to 15 wt %, less than or equal to 12.5 wt %, less than or equal to 10 wt %, less than or equal to 8 wt %, less than or equal to 7 wt %, less than or equal to 6 wt %, less than or equal to 5.5 wt %, less than or equal to 5 wt %, less than or equal to 4.5 wt %, less than or equal to 4 wt %, less than or equal to 3.5 wt %, less than or equal to 3 wt %, less than or equal to 2.5 wt %, less than or equal to 2 wt %, less than or equal to 1.5 wt %, less than or equal to 1 wt %, or less than or equal to 0.5 wt % of the layer, fiber web, and/or battery separator. Combinations of the above-referenced ranges are also possible (e.g., greater than or equal to 0 wt % and less than or equal to 40 wt %, greater than or equal to 3 wt % and less than or equal to 30 wt %, or greater than or equal to 5 wt % and less than or equal to 20 wt %). Other ranges are also possible.

A battery separator may comprise an amount of monocomponent synthetic fibers in one or more of the ranges described above and/or one or more layers (e.g., one or more fiber webs, such as an embossed layer described herein) in a battery separator may each independently comprise an amount of monocomponent synthetic fibers in one or more of the ranges described above. In one set of embodiments, an embossed layer described herein comprises an amount of monocomponent synthetic fibers in one or more of the ranges described above.

When present, the monocomponent synthetic fibers in a layer, fiber web, and/or battery separator may have a variety of suitable average diameters. In some embodiments, a layer, fiber web, and/or battery separator comprises monocomponent synthetic fibers having an average diameter of greater than or equal to 3 microns, greater than or equal to 3.5 microns, greater than or equal to 4 microns, greater than or equal to 4.5 microns, greater than or equal to 5 microns, greater than or equal to 5.5 microns, greater than or equal to 6 microns, greater than or equal to 6.5 microns, greater than or equal to 7 microns, greater than or equal to 7.5 microns, greater than or equal to 8 microns, greater than or equal to 9 microns, greater than or equal to 10 microns, greater than or equal to 12.5 microns, greater than or equal to 15 microns, greater than or equal to 17.5 microns, greater than or equal to 20 microns, greater than or equal to 22.5 microns, greater than or equal to 25 microns, or greater than or equal to 27.5 microns. In some embodiments, a layer, fiber web, and/or battery separator comprises monocomponent synthetic fibers having an average diameter of less than or equal to 30 microns, less than or equal to 27.5 microns, less than or equal to 25 microns, less than or equal to 22.5 microns, less than or equal to 20 microns, less than or equal to 17.5 microns, less than or equal to 15 microns, less than or equal to 12.5 microns, less than or equal to 10 microns, less than or equal to 9 microns, less than or equal to 8 microns, less than or equal to 7.5 microns, less than or equal to 7 microns, less than or equal to 6.5 microns, less than or equal to 6 microns, less than or equal to 5.5 microns, less than or equal to 5 microns, less than or equal to 4.5 microns, less than or equal to 4 microns, or less than or equal to 3.5 microns. Combinations of the above-referenced ranges are also possible (e.g., greater than or equal to 3 microns and less than or equal to 30 microns, greater than or equal to 5 microns and less than or equal to 25 microns, or greater than or equal to 7 microns and less than or equal to 20 microns). Other ranges are also possible.

A battery separator may comprise monocomponent synthetic fibers having an average diameter in one or more of the ranges described above and/or one or more layers (e.g., one or more fiber webs, such as an embossed layer described herein) in a battery separator may each independently comprise monocomponent synthetic fibers having an average diameter in one or more of the ranges described above. In one set of embodiments, an embossed layer described herein comprises monocomponent synthetic fibers having an average diameter in one or more of the ranges described above.

When present, the monocomponent synthetic fibers in a layer, fiber web, and/or battery separator may have a variety of suitable average lengths. In some embodiments, a layer, fiber web, and/or battery separator comprises monocomponent synthetic fibers that are non-continuous, such as staple fibers. A layer, fiber web, and/or battery separator may comprise monocomponent synthetic fibers having an average length of greater than or equal to 2 mm, greater than or equal to 2.5 mm, greater than or equal to 3 mm, greater than or equal to 3.5 mm, greater than or equal to 4 mm, greater than or equal to 4.5 mm, greater than or equal to 5 mm, greater than or equal to 5.5 mm, greater than or equal to 6 mm, greater than or equal to 6.5 mm, greater than or equal to 7 mm, greater than or equal to 8 mm, greater than or equal to 10 mm, greater than or equal to 12.5 mm, greater than or equal to 15 mm, greater than or equal to 17.5 mm, greater than or equal to 20 mm, or greater than or equal to 22.5 mm. In some embodiments, a layer, fiber web, and/or battery separator comprises monocomponent synthetic fibers having an average length of less than or equal to 25 mm, less than or equal to 22.5 mm, less than or equal to 20 mm, less than or equal to 17.5 mm, less than or equal to 15 mm, less than or equal to 12.5 mm, less than or equal to 10 mm, less than or equal to 8 mm, less than or equal to 7 mm, less than or equal to 6.5 mm, less than or equal to 6 mm, less than or equal to 5.5 mm, less than or equal to 5 mm, less than or equal to 4.5 mm, less than or equal to 4 mm, less than or equal to 3.5 mm, less than or equal to 3 mm, or less than or equal to 2.5 mm. Combinations of the above-referenced ranges are also possible (e.g., greater than or equal to 2 mm and less than or equal to 25 mm, greater than or equal to 4 mm and less than or equal to 20 mm, or greater than or equal to 6 mm and less than or equal to 15 mm). Other ranges are also possible.

A battery separator may comprise monocomponent synthetic fibers having an average length in one or more of the ranges described above and/or one or more layers (e.g., one or more fiber webs, such as an embossed layer described herein) in a battery separator may each independently comprise monocomponent synthetic fibers having an average length in one or more of the ranges described above. In one set of embodiments, an embossed layer described herein comprises monocomponent synthetic fibers having an average length in one or more of the ranges described above.

Layers (e.g., fiber webs) suitable for inclusion in the battery separators described herein may comprise multicomponent fibers. Such fibers may comprise two or more components having different chemical compositions from each other, some or all of which may be synthetic. In other words, in some embodiments, some layers suitable for inclusion in the battery separators described herein, such as some such fiber webs, comprise synthetic fibers that are multicomponent fibers (e.g., in addition to or instead of monocomponent synthetic fibers). Non-limiting examples of suitable materials that may be present in a component of a multicomponent fiber include poly(olefin) s such as poly(ethylene), poly (propylene), and poly(butylene); polyesters and/or co-polyesters such as poly(ethylene terephthalate), co-poly(ethylene terephthalate), poly(butylene terephthalate), and poly(ethylene isophthalate); polyamides and co-polyamides such as nylons and aramids; and halogenated polymers such as poly(tetrafluoroethylene).

A battery separator may comprise multicomponent synthetic fibers having one or more of the properties described above and/or one or more layers (e.g., one or more fiber webs, such as an embossed layer described herein) in a battery separator may each independently comprise multicomponent synthetic fibers having one or more of the properties described above. In one set of embodiments, an embossed layer described herein comprises multicomponent synthetic fibers having one or more of the properties described above.

When present, multicomponent fibers may have a variety of suitable structures. In some embodiments, the multicomponent fibers comprise bicomponent fibers (i.e., fibers including two components). The bicomponent fibers may have a variety of suitable structures. For instance, a layer, fiber web, and/or battery separator may comprise one or more of the following types of bicomponent fibers: core/sheath fibers (e.g., concentric core/sheath fibers, non-concentric core/sheath fibers), segmented pie fibers, split fibers, side-by-side fibers, tip-trilobal fibers, and "island in the sea" fibers. In some embodiments, a layer, fiber web, and/or battery separator may comprise a multicomponent fiber that initially had one of the above-referenced structures, but underwent a process (e.g., a splitting process) during fabrication of the fiber web and/or battery separator to form a different structure. By way of example, some layers, fiber webs, and/or battery separator may comprise fibers that were initially bicomponent fibers but were split during fiber web fabrication and/or battery fabrication to form finer fibers.

A battery separator may comprise multicomponent synthetic fibers having one or more of the properties described above and/or one or more layers (e.g., one or more fiber webs, such as an embossed layer described herein) in a battery separator may each independently comprise multicomponent synthetic fibers having one or more of the properties described above. In one set of embodiments, an embossed layer described herein comprises multicomponent synthetic fibers having one or more of the properties described above.

When core/sheath bicomponent fibers are present, the sheath may have a lower melting temperature than the core. When heated, the sheath may melt prior to the core, binding other fibers within the fiber web together while the core remains solid. Non-limiting examples of suitable bicomponent fibers, in which the component with the lower melting temperature is listed first and the component with the higher melting temperature is listed second, include the following: poly(ethylene)/poly(ethylene terephthalate), poly(propylene)/poly(ethylene terephthalate), co-poly(ethylene terephthalate)/poly(ethylene terephthalate), poly(butylene terephthalate)/poly(ethylene terephthalate), co-polyamide/polyamide, and poly(ethylene)/poly(propylene). When a battery separator comprises two or more layers comprising bicomponent fibers, each layer may independently comprise bicomponent fibers having one or more of the compositions described above.

A battery separator may comprise multicomponent synthetic fibers having one or more of the properties described above and/or one or more layers (e.g., one or more fiber webs, such as an embossed layer described herein) in a battery separator may each independently comprise multicomponent synthetic fibers having one or more of the properties described above. In one set of embodiments, an embossed layer described herein comprises multicomponent synthetic fibers having one or more of the properties described above.

When present, the multicomponent fibers may make up greater than or equal to 0 wt %, greater than or equal to 1 wt %, greater than or equal to 2 wt %, greater than or equal to 3 wt %, greater than or equal to 4 wt %, greater than or equal to 5 wt %, greater than or equal to 7.5 wt %, greater than or equal to 10 wt %, greater than or equal to 12.5 wt %, greater than or equal to 15 wt %, greater than or equal to 17.5 wt %, greater than or equal to 20 wt %, greater than or equal to 22.5 wt %, greater than or equal to 25 wt %, greater than or equal to 27.5 wt %, greater than or equal to 30 wt %, greater than or equal to 32.5 wt %, greater than or equal to 35 wt %, or greater than or equal to 37.5 wt % of the layer, fiber web, and/or battery separator. The multicomponent fibers may make up less than or equal to 40 wt %, less than or equal to 37.5 wt %, less than or equal to 35 wt %, less than or equal to 32.5 wt %, less than or equal to 30 wt %, less than or equal to 27.5 wt %, less than or equal to 25 wt %, less than or equal to 22.5 wt %, less than or equal to 20 wt %, less than or equal to 17.5 wt %, less than or equal to 15 wt %, less than or equal to 12.5 wt %, less than or equal to 10 wt %, less than or equal to 7.5 wt %, less than or equal to 5 wt %, less than or equal to 4 wt %, less than or equal to 3 wt %, less than or equal to 2 wt %, or less than or equal to 1 wt % of the layer, fiber web, and/or battery separator. Combinations of the above-referenced ranges are also possible (e.g., greater than or equal to 0 wt % and less than or equal to 40 wt %, greater than or equal to 3 wt % and less than or equal to 30 wt %, or greater than or equal to 5 wt % and less than or equal to 20 wt %). Other ranges are also possible.

A battery separator may comprise an amount of multicomponent synthetic fibers in one or more of the ranges described above and/or one or more layers (e.g., one or more fiber webs, such as an embossed layer described herein) in a battery separator may each independently comprise an amount of multicomponent synthetic fibers in one or more of the ranges described above. In one set of embodiments, an embossed layer described herein comprises an amount of multicomponent synthetic fibers in one or more of the ranges described above.

When present, the multicomponent fibers in a layer, fiber web, and/or battery separator may have a variety of suitable average diameters. In some embodiments, a layer, fiber web, and/or battery separator comprises multicomponent fibers having an average diameter of greater than or equal to 3 microns, greater than or equal to 3.5 microns, greater than or equal to 4 microns, greater than or equal to 4.5 microns, greater than or equal to 5 microns, greater than or equal to 5.5 microns, greater than or equal to 6 microns, greater than or equal to 6.5 microns, greater than or equal to 7 microns, greater than or equal to 7.5 microns, greater than or equal to 8 microns, greater than or equal to 9 microns, greater than or equal to 10 microns, greater than or equal to 12.5 microns, greater than or equal to 15 microns, greater than or equal to 17.5 microns, greater than or equal to 20 microns, greater than or equal to 22.5 microns, greater than or equal to 25 microns, or greater than or equal to 27.5 microns. In some embodiments, a layer, fiber web, and/or battery separator comprises multicomponent fibers having an average diameter of less than or equal to 30 microns, less than or equal to 27.5 microns, less than or equal to 25 microns, less than or equal to 22.5 microns, less than or equal to 20 microns, less than or equal to 17.5 microns, less than or equal to 15 microns, less than or equal to 12.5 microns, less than or equal to 10 microns, less than or equal to 9 microns, less than or equal to 8 microns, less than or equal to 7.5 microns, less than or equal to 7 microns, less than or equal to 6.5 microns, less than or equal to 6 microns, less than or equal to 5.5 microns, less than or equal to 5 microns, less than or equal to 4.5 microns, less than or equal to 4 microns, or less than or equal to 3.5 microns. Combinations of the above-referenced ranges are also possible (e.g., greater than or equal to 3 microns and less than or equal to 30 microns, greater than or equal to 5 microns and less than or equal to 25 microns, or greater than or equal to 7 microns and less than or equal to 20 microns). Other ranges are also possible.

A battery separator may comprise multicomponent synthetic fibers having an average diameter in one or more of the ranges described above and/or one or more layers (e.g., one or more fiber webs, such as an embossed layer described herein) in a battery separator may each independently comprise multicomponent synthetic fibers having an average diameter in one or more of the ranges described above. In one set of embodiments, an embossed layer described herein comprises multicomponent synthetic fibers having an average diameter in one or more of the ranges described above.

When present, the multicomponent fibers in a layer, fiber web, and/or battery separator may have a variety of suitable average lengths. In some embodiments, a layer, fiber web, and/or battery separator comprises multicomponent fibers that are non-continuous, such as staple fibers. A layer, fiber web, and/or battery separator may comprise multicomponent fibers having an average length of greater than or equal to 2 mm, greater than or equal to 2.5 mm, greater than or equal to 3 mm, greater than or equal to 3.5 mm, greater than or equal to 4 mm, greater than or equal to 4.5 mm, greater than or equal to 5 mm, greater than or equal to 5.5 mm, greater than or equal to 6 mm, greater than or equal to 6.5 mm, greater than or equal to 7 mm, greater than or equal to 8 mm, greater than or equal to 10 mm, greater than or equal to 12.5 mm, greater than or equal to 15 mm, greater than or equal to 17.5 mm, greater than or equal to 20 mm, or greater than or equal to 22.5 mm. In some embodiments, a layer, fiber web, and/or battery separator comprises multicomponent fibers having an average length of less than or equal to 25 mm, less than or equal to 22.5 mm, less than or equal to 20 mm, less than or equal to 17.5 mm, less than or equal to 15 mm, less than or equal to 12.5 mm, less than or equal to 10 mm, less than or equal to 8 mm, less than or equal to 7 mm, less than or equal to 6.5 mm, less than or equal to 6 mm, less than or equal to 5.5 mm, less than or equal to 5 mm, less than or equal to 4.5 mm, less than or equal to 4 mm, less than or equal to 3.5 mm, less than or equal to 3 mm, or less than or equal to 2.5 mm. Combinations of the above-referenced ranges are also possible (e.g., greater than or equal to 2 mm and less than or equal to 25 mm, greater than or equal to 4 mm and less than or equal to 20 mm, or greater than or equal to 6 mm and less than or equal to 15 mm). Other ranges are also possible.

A battery separator may comprise multicomponent synthetic fibers having an average length in one or more of the ranges described above and/or one or more layers (e.g., one or more fiber webs, such as an embossed layer described herein) in a battery separator may each independently comprise multicomponent synthetic fibers having an average length in one or more of the ranges described above. In one set of embodiments, an embossed layer described herein comprises multicomponent synthetic fibers having an average length in one or more of the ranges described above.

The battery separators and layers therein, such as fiber webs, may have a variety of suitable physical properties. Further detail regarding such properties are provided below.

A layer, fiber web, and/or battery separator may have a porosity of greater than or equal to 75%, greater than or equal to 76%, greater than or equal to 77%, greater than or equal to 78%, greater than or equal to 79%, greater than or equal to 80%, greater than or equal to 81%, greater than or equal to 82%, greater than or equal to 83%, greater than or equal to 84%, greater than or equal to 85%, greater than or equal to 86%, greater than or equal to 87%, greater than or equal to 88%, greater than or equal to 89%, greater than or equal to 90%, greater than or equal to 91%, greater than or equal to 92%, greater than or equal to 93%, greater than or equal to 94%, greater than or equal to 95%, greater than or equal to 96%, or greater than or equal to 97%. In some embodiments, a layer, fiber web, and/or battery separator has a porosity of less than or equal to 98%, less than or equal to 97%, less than or equal to 96%, less than or equal to 95%, less than or equal to 94%, less than or equal to 93%, less than or equal to 92%, less than or equal to 91%, less than or equal to 90%, less than or equal to 89%, less than or equal to 88%, less than or equal to 87%, less than or equal to 86%, less than or equal to 85%, less than or equal to 84%, less than or equal to 83%, less than or equal to 82%, less than or equal to 81%, less than or equal to 80%, less than or equal to 79%, less than or equal to 78%, less than or equal to 77%, or less than or equal to 76%. Combinations of the above-referenced ranges are also possible (e.g., greater than or equal to 75% and less than or equal to 98%, greater than or equal to 80% and less than or equal to 97%, or greater than or equal to 85% and less than or equal to 96%). Other ranges are also possible.

A battery separator may have a porosity in one or more of the ranges described above and/or one or more layers (e.g., one or more fiber webs, such as an embossed layer described herein) in a battery separator may each independently have a porosity in one or more of the ranges described above. In one set of embodiments, an embossed layer described herein has a porosity in one or more of the ranges described above.

The porosity of a component (e.g., a layer, fiber web, and/or battery separator) is equivalent to 100%-[solidity of the component]. The solidity of a component is equivalent to the percentage of the interior of the component occupied by solid material. In other words, it is equal to 100% multiplied by the ratio of the volume of the solid material in the component to the geometric volume of the component. The geometric volume of a component should be understood to refer to the volume enclosed by the external surfaces of the component.

The layers, fiber webs, and battery separators described herein may have a variety of suitable basis weights. In some embodiments, a layer, fiber web, and/or battery separator has a basis weight of greater than or equal to 50 $g/m^2$, greater than or equal to 55 $g/m^2$, greater than or equal to 60 $g/m^2$, greater than or equal to 65 $g/m^2$, greater than or equal to 70 $g/m^2$, greater than or equal to 75 $g/m^2$, greater than or equal to 80 $g/m^2$, greater than or equal to 85 $g/m^2$, greater than or equal to 90 $g/m^2$, greater than or equal to 95 $g/m^2$, greater than or equal to 100 $g/m^2$, greater than or equal to 110 $g/m^2$, greater than or equal to 120 $g/m^2$, greater than or equal to 150 $g/m^2$, greater than or equal to 175 $g/m^2$, greater than or equal to 200 $g/m^2$, greater than or equal to 250 $g/m^2$, greater than or equal to 300 $g/m^2$, greater than or equal to 350 $g/m^2$, greater than or equal to 400 $g/m^2$, greater than or equal to 450 $g/m^2$, greater than or equal to 500 $g/m^2$, or greater than or equal to 550 $g/m^2$. In some embodiments, a layer, fiber web, and/or battery separator has a basis weight of less than or equal to 600 $g/m^2$, less than or equal to 550 $g/m^2$, less than or equal to 500 $g/m^2$, less than or equal to 450 $g/m^2$, less than or equal to 400 $g/m^2$, less than or equal to 350 $g/m^2$, less than or equal to 300 $g/m^2$, less than or equal to 250 $g/m^2$, less than or equal to 200 $g/m^2$, less than or equal to 175 $g/m^2$, less than or equal to 150 $g/m^2$, less than or equal to 120 $g/m^2$, less than or equal to 110 $g/m^2$, less than or equal to 100 $g/m^2$, less than or equal to 95 $g/m^2$, less than or equal to 90 $g/m^2$, less than or equal to 85 $g/m^2$, less than or equal to 80 $g/m^2$, less than or equal to 75 $g/m^2$, less than or equal to 70 $g/m^2$, less than or equal to 65 $g/m^2$, less than or equal to 60 $g/m^2$, or less than or equal to 55 $g/m^2$. Combinations of the above-referenced ranges are also possible (e.g., greater than or equal to 50 $g/m^2$ and less than or equal to 600 $g/m^2$, greater than or equal to 70 $g/m^2$ and less than or equal to 500 $g/m^2$, or greater than or equal to 90 $g/m^2$ and less than or equal to 450 $g/m^2$). Other ranges are also possible.

A battery separator may have a basis weight in one or more of the ranges described above and/or one or more layers (e.g., one or more fiber webs, such as an embossed layer described herein) in a battery separator may each independently have a basis weight in one or more of the ranges described above.

The basis weight of a layer, fiber web, and/or battery separator may be determined according to the standard ISO 536:2012.

The thicknesses of the layers, fiber webs, and battery separators described herein may generally be selected as desired. In some embodiments, a layer, fiber web, and/or battery separator has a thickness of greater than or equal to 0.5 mm, greater than or equal to 0.55 mm, greater than or equal to 0.6 mm, greater than or equal to 0.65 mm, greater than or equal to 0.7 mm, greater than or equal to 0.75 mm, greater than or equal to 0.8 mm, greater than or equal to 0.9 mm, greater than or equal to 1 mm, greater than or equal to 1.25 mm, greater than or equal to 1.5 mm, greater than or equal 1.75 mm, greater than or equal to 2 mm, greater than or equal to 2.25 mm, greater than or equal to 2.5 mm, greater than or equal to 2.75 mm, greater than or equal to 3 mm, greater than or equal to 3.25 mm, greater than or equal to 3.5 mm, greater than or equal to 3.75 mm, greater than or equal to 4 mm, greater than or equal to 4.25 mm, greater than or equal to 4.5 mm, or greater than or equal to 4.75 mm. In some embodiments, a layer, fiber web, and/or battery separator has a thickness of less than or equal to 5 mm, less than or equal to 4.75 mm, less than or equal to 4.5 mm, less than or equal to 4.25 mm, less than or equal to 4 mm, less than or equal to 3.75 mm, less than or equal to 3.5 mm, less than or equal to 3.25 mm, less than or equal to 3 mm, less than or equal to 2.75 mm, less than or equal to 2.5 mm, less than or equal to 2.25 mm, less than or equal to 2 mm, less than or equal to 1.75 mm, less than or equal to 1.5 mm, less than or equal to 1.25 mm, less than or equal to 1 mm, less than or equal to 0.9 mm, less than or equal to 0.8 mm, less than or equal to 0.75 mm, less than or equal to 0.7 mm, less than or equal to 0.65 mm, less than or equal to 0.6 mm, or less than or equal to 0.55 mm. Combinations of the above-referenced ranges are also possible (e.g., greater than or equal to 0.5 mm and less than or equal to 5 mm, greater than or equal to 0.6 mm and less than or equal to 4 mm, or greater than or equal to 0.7 mm and less than or equal to 3 mm). Other ranges are also possible.

A battery separator may have a thickness in one or more of the ranges described above and/or one or more layers (e.g., one or more fiber webs, such as an embossed layer described herein) in a battery separator may each independently have a thickness in one or more of the ranges described above.

The thickness of a layer, fiber web, and/or battery separator may be determined according to the standard BCIS-03A, Sept-09, Method 10 under 10 kPa applied pressure.

In some embodiments, a layer, fiber web, and/or battery separator has a relatively high tensile strength in the machine direction. The layer, fiber web, and/or battery separator may have a tensile strength in the machine direction of greater than or equal to 0.3 lbs/in, greater than or equal to 0.35 lbs/in, greater than or equal to 0.4 lbs/in, greater than or equal to 0.45 lbs/in, greater than or equal to 0.5 lbs/in, greater than or equal to 0.55 lbs/in, greater than or equal to 0.6 lbs/in, greater than or equal to 0.65 lbs/in, greater than or equal to 0.7 lbs/in, greater than or equal to 0.75 lbs/in, greater than or equal to 0.8 lbs/in, greater than or equal to 0.9 lbs/in, greater than or equal to 1 lb/in, greater than or equal to 1.25 lbs/in, greater than or equal to 1.5 lbs/in, greater than or equal to 2 lbs/in, greater than or equal to 3 lbs/in, greater than or equal to 5 lbs/in, greater than or equal to 7 lbs/in, greater than or equal to 10 lbs/in, greater than or equal to 12 lbs/in, greater than or equal to 15 lbs/in, or greater than or equal to 17 lbs/in. The layer, fiber web, and/or battery separator may have a tensile strength in the machine direction of less than or equal to 20 lbs/in, less than or equal to 17 lbs/in, less than or equal to 15 lbs/in, less than or equal to 12 lbs/in, less than or equal to 10 lbs/in, less than or equal to 7 lbs/in, less than or equal to 5 lbs/in, less than or equal to 3 lbs/in, less than or equal to 2 lbs/in, less than or equal to 1.5 lbs/in, less than or equal to 1.25 lbs/in, less than or equal to 1 lb/in, less than or equal to 0.9 lbs/in, less than or equal to 0.8 lbs/in, less than or equal to 0.75 lbs/in, less than or equal to 0.7 lbs/in, less than or equal to 0.65 lbs/in, less than or equal to 0.6 lbs/in, less than or equal to 0.55 lbs/in, less than or equal to 0.5 lbs/in, less than or equal to 0.45 lbs/in, less than or equal to 0.4 lbs/in, or less than or equal to 0.35 lbs/in. Combinations of the above-referenced ranges are also possible (e.g., greater than or equal to 0.3 lbs/in and less than or equal to 20 lbs/in, greater than or equal to 0.5 lbs/in and less than or equal to 15 lbs/in, or greater than or equal to 0.7 lbs/in and less than or equal to 12 lbs/in). Other ranges are also possible.

A battery separator may have a tensile strength in the machine direction in one or more of the ranges described above and/or one or more layers (e.g., one or more fiber webs, such as an embossed layer described herein) in a battery separator may each independently have a tensile strength in the machine direction in one or more of the ranges described above.

The tensile strength in the machine direction of a layer, fiber web, and/or battery separator may be determined according to the standard BCIS 03B (2018).

In some embodiments, a layer, fiber web, and/or battery separator has a relatively high tensile strength in the cross direction. The layer, fiber web, and/or battery separator may have a tensile strength in the cross direction of greater than or equal to 0.3 lbs/in, greater than or equal to 0.35 lbs/in, greater than or equal to 0.4 lbs/in, greater than or equal to 0.45 lbs/in, greater than or equal to 0.5 lbs/in, greater than or equal to 0.55 lbs/in, greater than or equal to 0.6 lbs/in, greater than or equal to 0.65 lbs/in, greater than or equal to 0.7 lbs/in, greater than or equal to 0.75 lbs/in, greater than or equal to 0.8 lbs/in, greater than or equal to 0.9 lbs/in, greater than or equal to 1 lb/in, greater than or equal to 1.25 lbs/in, greater than or equal to 1.5 lbs/in, greater than or equal to 2 lbs/in, greater than or equal to 3 lbs/in, greater than or equal to greater than or equal to 4 lbs/in, greater than or equal to 5 lbs/in, greater than or equal to 6 lbs/in, greater than or equal to 8 lbs/in, greater than or equal to 10 lbs/in, or greater than or equal to 12 lbs/in. The layer, fiber web, and/or battery separator may have a tensile strength in the cross direction of less than or equal to 15 lbs/in, less than or equal to 12 lbs/in, less than or equal to 10 lbs/in, less than or equal to 8 lbs/in, less than or equal to 6 lbs/in, less than or equal to 5 lbs/in, less than or equal to 4 lbs/in, less than or equal to 3 lbs/in, less than or equal to 2 lbs/in, less than or equal to 1.5 lbs/in, less than or equal to 1.25 lbs/in, less than or equal to 1 lb/in, less than or equal to 0.9 lbs/in, less than or equal to 0.8 lbs/in, less than or equal to 0.75 lbs/in, less than or equal to 0.7 lbs/in, less than or equal to 0.65 lbs/in, less than or equal to 0.6 lbs/in, less than or equal to 0.55 lbs/in, less than or equal to 0.5 lbs/in, less than or equal to 0.45 lbs/in, less than or equal to 0.4 lbs/in, or less than or equal to 0.35 lbs/in. Combinations of the above-referenced ranges are also possible (e.g., greater than or equal to 0.3 lbs/in and less than or equal to 15 lbs/in, greater than or equal to 0.5 lbs/in and less than or equal to 12 lbs/in, or greater than or equal to 0.7 lbs/in and less than or equal to 8 lbs/in). Other ranges are also possible.

A battery separator may have a tensile strength in the cross direction in one or more of the ranges described above and/or one or more layers (e.g., one or more fiber webs, such as an embossed layer described herein) in a battery separator may each independently have a tensile strength in the cross direction in one or more of the ranges described above.

The tensile strength in the cross direction of a layer, fiber web, and/or battery separator may be determined according to the standard BCIS 03B (2018).

In some embodiments, a layer, fiber web, and/or battery separator has a relatively low elongation at break in the machine direction. The layer, fiber web, and/or battery separator may have an elongation at break in the machine direction of less than or equal to 15%, less than or equal to 12%, less than or equal to 10%, less than or equal to 8%, less than or equal to 6%, less than or equal to 5%, less than or equal to 4%, less than or equal to 3%, less than or equal to 2%, less than or equal to 1.5%, less than or equal to 1.25%, less than or equal to 1%, less than or equal to 0.9%, less than or equal to 0.8%, less than or equal to 0.75%, less than or equal to 0.7%, less than or equal to 0.65%, less than or equal to 0.6%, less than or equal to 0.55%, less than or equal to 0.5%, or less than or equal to 0.45%. The layer, fiber web, and/or battery separator may have an elongation at break in the machine direction of greater than or equal to 0.4%, greater than or equal to 0.45%, greater than or equal to 0.5%, greater than or equal to 0.55%, greater than or equal to 0.6%, greater than or equal to 0.65%, greater than or equal to 0.7%, greater than or equal to 0.75%, greater than or equal to 0.8%, greater than or equal to 0.9%, greater than or equal to 1%, greater than or equal to 1.25%, greater than or equal to 1.5%, greater than or equal to 2%, greater than or equal to 3%, greater than or equal to 4%, greater than or equal to 5%, greater than or equal to 6%, greater than or equal to 8%, greater than or equal to 10%, or greater than or equal to 12%. Combinations of the above-referenced ranges are also possible (e.g., less than or equal to 15% and greater than or equal to 0.4%, less than or equal to 12% and greater than or equal to 0.6%, or less than or equal to 10% and greater than or equal to 0.8%). Other ranges are also possible.

A battery separator may have an elongation at break in the machine direction in one or more of the ranges described above and/or one or more layers (e.g., one or more fiber webs, such as an embossed layer described herein) in a battery separator may each independently have an elongation at break in the machine direction in one or more of the ranges described above.

The elongation at break in the machine direction of a layer, fiber web, and/or battery separator may be determined according to the standard BCIS 03B (2018).

In some embodiments, a layer, fiber web, and/or battery separator has a relatively low elongation at break in the cross direction. The layer, fiber web, and/or battery separator may have an elongation at break in the cross direction of less than or equal to 20%, less than or equal to 17.5%, less than or equal to 15%, less than or equal to 12%, less than or equal to 10%, less than or equal to 8%, less than or equal to 6%, less than or equal to 5%, less than or equal to 4%, less than or equal to 3%, less than or equal to 2%, less than or equal to 1.5%, less than or equal to 1.25%, less than or equal to 1%, less than or equal to 0.9%, less than or equal to 0.8%, less than or equal to 0.75%, less than or equal to 0.7%, less than or equal to 0.65%, less than or equal to 0.6%, less than or equal to 0.55%, less than or equal to 0.5%, or less than or equal to 0.45%. The layer, fiber web, and/or battery separator may have an elongation at break in the cross direction of greater than or equal to 0.4%, greater than or equal to 0.45%, greater than or equal to 0.5%, greater than or equal to 0.55%, greater than or equal to 0.6%, greater than or equal to 0.65%, greater than or equal to 0.7%, greater than or equal to 0.75%, greater than or equal to 0.8%, greater than or equal to 0.9%, greater than or equal to 1%, greater than or equal to 1.25%, greater than or equal to 1.5%, greater than or equal to 2%, greater than or equal to 3%, greater than or equal to 4%, greater than or equal to 5%, greater than or equal to 6%, greater than or equal to 8%, greater than or equal to 10%, greater than or equal to 12%, greater than or equal to 15%, or greater than or equal to 17.5%. Combinations of the above-referenced ranges are also possible (e.g., less than or equal to 20% and greater than or equal to 0.4%, less than or equal to 15% and greater than or equal to 0.6%, or less than or equal to 12% and greater than or equal to 0.8%). Other ranges are also possible.

A battery separator may have an elongation at break in the cross direction in one or more of the ranges described above and/or one or more layers (e.g., one or more fiber webs, such as an embossed layer described herein) in a battery separator may each independently have an elongation at break in the cross direction in one or more of the ranges described above.

The elongation at break in the cross direction of a layer, fiber web, and/or battery separator may be determined according to the standard BCIS 03B (2018).

As described elsewhere herein, in some embodiments, a battery separator described herein may be suitable for use in a battery and/or a battery comprising a battery separator described herein may be provided. By way of example, in some embodiments, a battery separator described herein may be suitable for use in a lead-acid battery and/or the embodiment may relate to a lead-acid battery comprising a separator described herein. Lead-acid batteries typically comprise a first battery plate (e.g., a negative battery plate) that comprises lead and a second battery plate (e.g., a positive battery plate) that comprises lead dioxide. During discharge, electrons pass from the first battery plate to the second battery plate while the lead paste in the first battery plate is oxidized to form lead sulfate and the lead dioxide in the second battery plate is reduced to also form lead sulfate. During charge, electrons pass from the second battery plate to the first battery plate while the lead sulfate in the first battery plate is reduced to form lead and the lead sulfate in the second battery plate is oxidized to form lead dioxide.

In some embodiments, a separator as described herein may be configured for use in a valve regulated lead-acid battery (VRLA) battery, such as an AGM/VRLA battery (and/or may be present in a VRLA battery such as an AGM/VRLA battery). VRLA batteries are lead-acid batteries that comprise a valve configured to vent one or more gases from the battery. These gases may include gases that form as a result of electrolyte decomposition during overcharging, such as hydrogen gas and/or oxygen gas. It may be desirable to maintain the gases in the battery so that they may recombine, reducing or eliminating the need to replenish the decomposed electrolyte. However, it may also be desirable to maintain the pressure inside the battery at a safe level. For these reasons, the valve may be configured to vent the gas(es) under some circumstances, such as when the pressure inside the battery is above a threshold value, but not in others, such as when the pressure inside the battery is below the threshold value.

When the battery separators described herein are assembled, with further components, to form a final battery, the battery may compress the battery separator. This compression may cause the battery separator to have a thickness that is less than the thickness it had prior to incorporation into the battery and/or the thickness it would have if free standing (i.e., uncompressed). Without wishing to be bound by any particular theory, the presence of embossments in a surface of a battery separator compressed in this manner may be particularly advantageous. It is believed that portions of the surfaces of the battery separator that are unembossed may directly contact and/or be compressed by the other battery components to which they are adjacent after battery assembly. It is also believed that portions of the surface of the battery separator that are embossed may not directly contact such battery components. In other words, it is believed that, even upon compression of the battery separator by the battery, the embossments may take the form of channels that are positioned between the battery separator and other components in the battery other than the electrolyte (e.g., battery plates therein). As described elsewhere herein, such channels may advantageously promote the transport of gas from within the battery to the edges of the battery separator upon filling of the battery by the electrolyte, reducing acid filling time.

Battery plates present in the batteries described herein typically comprise a battery paste disposed on a grid. A battery paste included in a first battery plate (e.g., a negative battery plate) may comprise lead, and/or may comprise both lead and lead dioxide (e.g., prior to full charging, during fabrication, during battery assembly, and/or during one or more portions of a method described herein). A battery paste included in a second battery plate (e.g., a positive battery plate), may comprise lead dioxide, and/or may comprise both lead and lead dioxide (e.g., prior to full charging, during fabrication, during battery assembly, and/or during one or more portions of a method described herein). Grids, in some embodiments, include lead and/or a lead alloy.

In some embodiments, one or more battery plates may further comprise one or more additional components. For instance, a battery plate may comprise a reinforcing material, such as an expander. When present, an expander may comprise barium sulfate, carbon black and lignin sulfonate as the primary components. The components of the expander (s) (e.g., carbon black and/or lignin sulfonate, if present, and/or any other components) can be pre-mixed or not pre-mixed. In some embodiments, a battery plate may comprise a commercially available expander, such as an expander produced by Hammond Lead Products (Hammond, IN) (e.g., a Texex® expander) or an expander produced by Atomized Products Group, Inc. (Garland, TX). Further examples of reinforcing materials include chopped organic fibers (e.g., having an average length of 0.125 inch or more), chopped glass fibers, metal sulfate(s) (e.g., nickel sulfate, copper sulfate), red lead (e.g., a $Pb_3O_4$-containing material), litharge, and paraffin oil.

It should be understood that while the additional components described above may be present in any combination of battery plates in a battery, some additional components may be especially advantageous for some types of battery plates. For instance, expanders, metal sulfates, and paraffins may be especially advantageous for use in second or positive battery plates. One or more of these components may be present in a second or positive battery plate, and absent in a first or negative battery plates. Some additional components described above may have utility in many types of battery plates (e.g., first battery plates, negative battery plates, second battery plates, positive battery plates). Non-limiting examples of such components include fibers (e.g., chopped organic fibers, chopped glass fibers). These components may, in some embodiments, be present in both first and second battery plates, and/or be present in both negative and positive battery plates.

Example 1

This Example describes the production of an embossed separator suitable for use in AGM batteries and compares its physical properties to those of separators formed from the same furnish.

Three separators were formed from the furnish shown in Table 1 by a wet laying process: one that lacked embossments, one that comprised continuous embossments taking the form of straight lines forming a 45° angle to the machine direction, and one that comprised discontinuous embossments taking the form of ovals having a length of 27 mm and a width of 4 mm. In the separators comprising embossments, the embossments were formed by passing a wet laid layer formed from the furnish, while still wet, through two press rolls. One of these press rolls had an embossed pattern on its surface corresponding to the pattern embossed into the wet laid layer. The wet laid layer was then dried.

After fabrication, each separator was laminated between two transparent poly(carbonate) plates. Then, pressure was applied to the transparent poly(carbonate) plates to compress the separators such that the ratio of basis weight in g/m$^2$ to thickness in mm was approximately 220. During these processes, a rubber gasket was also positioned between the two transparent poly(carbonate) plates such that it surrounded the battery separator laterally, and two plastic shims were positioned between the rubber gasket and the battery separator.

After the above-described assembly process, the pressure in the space between the two transparent poly(carbonate) plates was reduced to approximately 200 Torr by use of a vacuum pump in fluidic communication with a hole in one of the transparent poly(carbonate) plates positioned above the battery separator. Then, red-dyed 1.28 spg $H_2SO_4$ at atmospheric pressure was introduced between the transparent poly(carbonate) plates through the same hole in the transparent poly(carbonate) plate. At certain points in time during this process, the red-dyed 1.28 spg $H_2SO_4$ was removed from fluidic communication with the hole in the poly(carbonate) plate and this hole was instead placed in fluidic communication with the vacuum pump for 5 seconds, after which it was placed again in fluidic communication with the red-dyed 1.28 spg $H_2SO_4$. This application of vacuum was performed to assist with the removal of air from the separators. The total amount of time from initial introduction of the red-dyed 1.28 spg $H_2SO_4$ to the space between the two transparent poly(carbonate) plates to the diffusion of this acid throughout the entire battery separator was recorded as the acid filling time.

Table 2 shows a variety of physical properties of the embossed and unembossed separators. As can be seen from Table 2, the embossed separator had comparable mechanical properties to the unembossed separator formed from the same furnish. Table 2 also shows that the embossed separator including the continuous embossments had a lower acid filling time than the unembossed separator formed from the same furnish. This separator also had a lower acid filling time than the separator formed from the same furnish but comprising discontinuous embossments. Notably, while vacuum needed to be applied three times to the unembossed separator and the separator embossed with discontinuous embossments in order to try to effect full removal of air therefrom, vacuum only needed to be applied once to the separator embossed with continuous embossments to do so.

TABLE 1

| Fiber Type | Wt % of Furnish |
| --- | --- |
| Microglass fibers | 85.4 |
| Chopped strand glass fibers | 6.1 |
| Bicomponent fibers | 8.5 |

TABLE 2

| Property | Value for Unembossed Separator 1 | Value for Embossed Separator 1 | Value for Embossed Separator 2 |
| --- | --- | --- | --- |
| Basis weight (g/m$^2$) | 279 | 282 | 274 |
| Thickness (mm) | 1.821 | 1.680 | 1.57 |
| Thickness upon Compression (mm) | 1.50 | 1.50 | 1.245 |
| Ratio of Basis Weight to Thickness upon Compression | 220 | 221 | 220 |
| Type of Embossing | N/A | Straight lines forming a 45° angle to the machine direction | Ovals having a length of 27 mm and a width of 4 mm |
| Embossment Average Depth (mm) | N/A | 0.61 | 0.25 |
| Embossment Frequency (1/m) | N/A | 125 | 125 |
| Embossment Average Width (mm) | N/A | 1.0 | 4.0 |
| Machine Direction Tensile Strength (lb/in) | 5.13 | 5.63 | 8.4 |
| Machine Direction Elongation at Break (%) | 5.07 | 5.83 | 8.1 |
| Cross Direction Tensile Strength (lb/in) | 2.89 | 3.0 | 3.3 |
| Cross Direction Elongation at Break (%) | 5.95 | 4.93 | 6.5 |
| Points in Time After Initial Introduction of 1.28 spg $H_2SO_4$ at which Separator was Placed in Fluidic Communication with Vacuum Pump | 2 minutes, 4 minutes, 10 minutes | 2 minutes | 2 minutes, 4 minutes, 10 minutes |
| Acid Filling Time | >20 minutes (testing stopped at 20 minutes, at which point separator still retained air) | 4 minutes | >20 minutes (testing stopped at 20 minutes, at which point separator still retained air) |

Example 2

This Example describes the production of a second embossed separator suitable for use in AGM batteries and compares its physical properties to those of a separator formed from the same furnish.

Two separators were formed from the furnish shown in Table 3 by a wetlaying process: one that lacked embossments, and one that comprised continuous embossments taking the form of straight lines forming a 45° angle to the machine direction. In the separator comprising embossments, the embossments were formed by passing a wet laid layer formed from the furnish, while still wet, through two press rolls. One of the press rolls had an embossed pattern on its surface corresponding to the pattern embossed into the wet laid layer. The wet laid layer was then dried.

After fabrication, each separator was laminated between two transparent poly(carbonate) plates, compressed, and filled with red-dyed 1.28 spg $H_2SO_4$ by the process described in Example 1.

Table 4 shows a variety of physical properties of the embossed and unembossed separators. As can be seen from Table 4, the embossed separator had comparable mechanical properties to the unembossed separator formed from the same furnish. Table 4 also shows that the embossed separator had a lower acid filling time than the unembossed separator formed from the same furnish. Notably, while vacuum needed to be applied three times to the unembossed separator in order to try to effect full removal of air therefrom, vacuum only needed to be applied once to the embossed separator to do so.

TABLE 3

| Fiber Type | Wt % of Furnish |
| --- | --- |
| Microglass fibers | 88.0 |
| Chopped strand glass fibers | 3.8 |
| Bicomponent fibers | 8.2 |

TABLE 4

| Property | Value for Unembossed Separator 2 | Value for Embossed Separator 3 |
| --- | --- | --- |
| Basis weight (g/m$^2$) | 175 | 175 |
| Thickness (mm) | 1.120 | 1.078 |
| Thickness upon Compression (mm) | 1.10 | 1.10 |

TABLE 4-continued

| Property | Value for Unembossed Separator 2 | Value for Embossed Separator 3 |
|---|---|---|
| Ratio of Basis Weight to Thickness upon Compression | 220 | 220 |
| Type of Embossing | N/A | Straight lines forming a 45° angle to the machine direction |
| Embossment Average Depth (mm) | N/A | 0.33 |
| Embossment Frequency (1/m) | N/A | 125 |
| Embossment Average Width (mm) | N/A | 1.0 |
| Machine Direction Tensile Strength (lb/in) | 2.86 | 2.88 |
| Machine Direction Elongation at Break (%) | 5.73 | 5.62 |
| Cross Direction Tensile Strength (lb/in) | 1.79 | 1.70 |
| Cross Direction Elongation at Break (%) | 5.64 | 5.57 |
| Points in Time After Initial Introduction of 1.28 spg $H_2SO_4$ at which Separator was Placed in Fluidic Communication with Vacuum Pump | 2 minutes, 5 minutes, 10 minutes | 2 minutes |
| Acid Filling Time | >20 minutes (testing stopped at 20 minutes, at which point separator still retained air) | 6 minutes |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A battery separator, comprising:

a wet laid fiber web comprising a plurality of glass fibers, wherein:

the fiber web comprises a first surface, the first surface is embossed with a plurality of embossments, the plurality of embossments takes the form of a plurality of indentations in the first surface, the plurality of embossments comprises embossments that each comprise at least a first intersection with a first edge of the fiber web and a second intersection with a second edge of the fiber web, one or more of the embossments that comprise at least the first intersection with the first edge of the fiber web and the second intersection with the second edge of the fiber web passes through the interior of the fiber web, the embossments in the wet laid fiber web lack embossments connecting two opposing edges of the fiber web.

2. A battery separator as in claim 1, wherein the first edge of the fiber web and the second edge of the fiber web are the same edge of the fiber web.

3. A battery separator as in claim 1, wherein the second edge of the fiber web is a different edge of the fiber web than the first edge of the fiber web.

4. A battery separator as in claim 3, wherein the second, different edge of the fiber web intersects the first edge of the fiber web.

5. A battery separator as in claim 1, wherein one of the first and second edges of the fiber web is parallel to the machine direction of the fiber web.

6. A battery separator as in claim 1, wherein one of the first and second edges of the fiber web is parallel to the cross direction of the fiber web.

7. A battery separator as in claim 1, wherein the plurality of embossments comprises embossments that are straight.

8. A battery separator as in claim 1, wherein the plurality of embossments comprises embossments that comprise one or more curves, bends, and/or kinks.

9. A battery separator as in claim 1, wherein the embossments make up greater than or equal to 2% and less than or equal to 50% of the first surface.

10. A battery separator as in claim 1, wherein the embossments have an average depth of greater than or equal to 0.05 times the thickness of the fiber web and less than or equal to 0.5 times the thickness of the fiber web.

11. A battery separator as in claim 1, wherein the first surface is an external surface of the battery separator.

12. A battery separator as in claim 1, wherein glass fibers make up greater than or equal to 50 wt % and less than or equal to 100 wt % of the fiber web.

13. A battery separator as in claim 1, wherein synthetic fibers make up greater than or equal to 0 wt % and less than or equal to 40 wt % of the fiber web.

14. A battery separator as in claim 1, wherein multicomponent fibers make up greater than or equal to 0 wt % and less than or equal to 40 wt % of the fiber web.

15. A battery separator as in claim 1, wherein a tensile strength of the battery separator in the machine direction is greater than or equal to 0.3 lbs/in and less than or equal to 20 lbs/in.

16. A battery separator as in claim 1, wherein an elongation at break of the battery separator in the machine direction is greater than or equal to 0.4% and less than or equal to 15% and/or wherein an elongation at break of the battery separator in the cross direction is greater than or equal to 0.4% and less than or equal to 20%.

17. A lead acid battery comprising the separator of claim 1.

18. A battery separator as in claim 1, wherein the plurality of embossments takes the form of a plurality of channels in the first surface.

19. A battery separator as in claim 1, wherein the embossments that comprise at least the first intersection with the first edge of the fiber web and the second intersection with the second edge of the fiber web have an average frequency of greater than or equal to 5 indentations per meter and less than or equal to 300 indentations per meter.

20. A battery separator as in claim 1, wherein the plurality of embossments comprises an ordered arrangement of embossments that each comprise at least a first intersection with a first edge of the fiber web and a second intersection with a second edge of the fiber web.

* * * * *